United States Patent [19]

Satoh

[11] Patent Number: 5,068,732
[45] Date of Patent: Nov. 26, 1991

[54] VIDEO DISPLAY APPARATUS

[75] Inventor: Yutaka Satoh, Nagoya, Japan

[73] Assignee: Hitachi, Ltd., Tokyo, Japan

[21] Appl. No.: 616,195

[22] Filed: Nov. 20, 1990

[30] Foreign Application Priority Data

Nov. 24, 1989 [JP] Japan .................................. 1-303107

[51] Int. Cl.⁵ ...................... H04N 3/223; H04N 6/262
[52] U.S. Cl. .................................... 358/180; 358/183; 340/731
[58] Field of Search ................ 340/730, 731; 358/180, 358/181, 182, 183

[56] References Cited

U.S. PATENT DOCUMENTS

| | | | |
|---|---|---|---|
| 4,233,628 | 11/1980 | Ciciora | 358/180 |
| 4,751,502 | 6/1988 | Ishii et al. | 340/709 |
| 4,990,902 | 2/1991 | Zenda | 340/731 |

FOREIGN PATENT DOCUMENTS 60-134284 7/1985 Japan.
62-028791 2/1987 Japan.

Primary Examiner—John K. Peng
Attorney, Agent, or Firm—Antonelli, Terry, Stout & Kraus

[57] ABSTRACT

A display apparatus, which is connected with a control device, receives from the control device synchronization (sync) signals and a video signal in synchronism with the sync signals having a prescribed display area. The display apparatus generates a deflection signal on the basis of the sync signals in a deflection signal generating circuit to scan a CRT. The display apparatus adds additional video signal outside of the display area of the video signal on the basis of the sync signals in a video signal adding circuit so that the display area for the video signal is expanded, and supply the video signal thus formed to the CRT. Thus, in the display apparatus, a white background area can be added outside of the display area in the CRT.

10 Claims, 21 Drawing Sheets

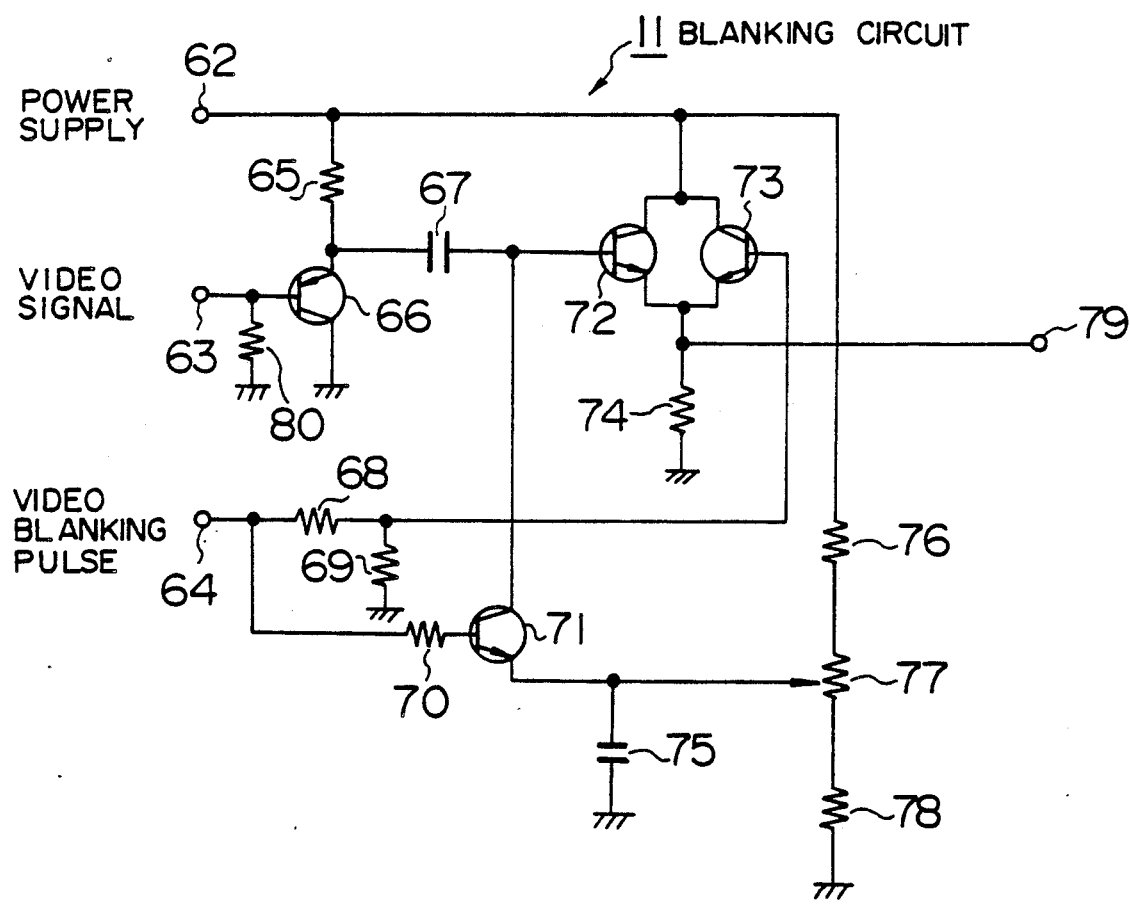

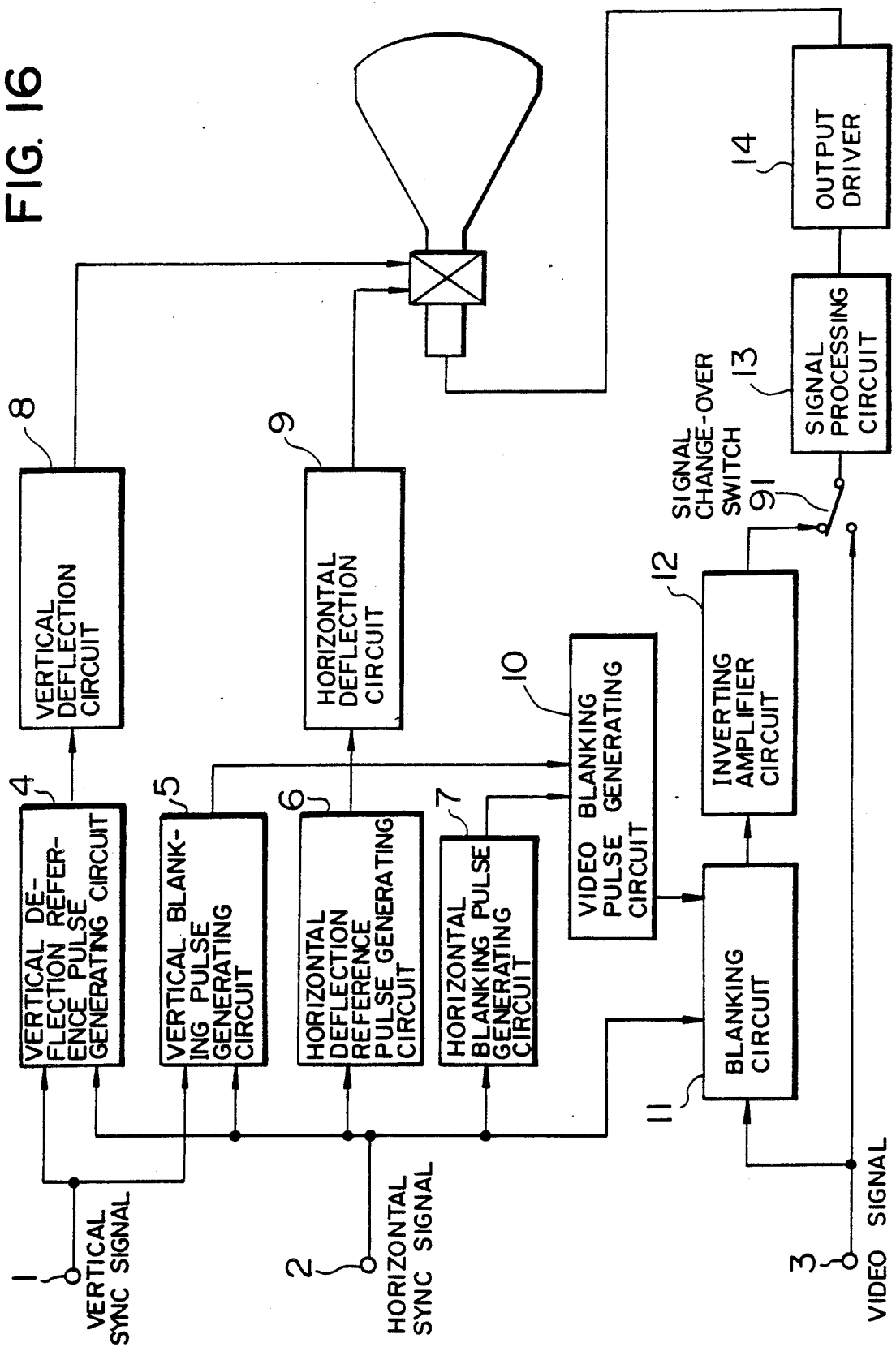

VIDEO DISPLAY APPARATUS

BACKGROUND OF THE INVENTION

The present invention relates to a video display apparatus and more particularly to a video display apparatus provided with a CRT (cathode ray tube).

Systems using a display apparatus as a control input medium have been widely used in various kinds of electronic control devices such as a computer.

Conventionally, characters, figures, etc. were displayed on a display in such a manner that the characters or figures to be desired to display are caused to light up on a black background. With improvement of performance in the display device, however, in some cases, a scheme in which characters and figures to be desired to display are displayed with black, gray, and color on a white-shining back ground as if the characters and figures were drawn on a sheet of white paper has been adopted mainly in a word processor and office computer (small business computer) for business processing. So-called 'paper whites' or display devices in which characters and figures are displayed in black or gray on a white back ground due to a white display and in particular, a monochromatic display device using CRT with white fluorescent substance applied (paper white CRT) has been widely used because of its low cost and excellent quality.

Meanwhile in a general purpose computer system, such as a small business computer, personal computer, etc. the display device used, which is connected with a control device through a cable, is adapted to be removable so that a user can select the display device in accordance with his use object from many kinds of display devices such as a color CRT, monochromatic (green) CRT, liquid crystal display, plasma display, etc. In such a system, the manner of display is changed in accordance with the display device connected. For example, the paper white CRT has a display format "background: white, character/figure: reverse display of black (black display on white background)", and the green CRT has a display format "background: black, character/figure: normal display of green (green display on black background)." Further, a video signal and a synchronization signal are transmitted as control signals for display; the video signal is transmitted for only a display area (valid or effective display area) which can be controlled by a control program.

In such a system, "black display on white background" in the white CRT has been implemented by a control program which serves to whiten the background and display characters or figures in black.

On the other hand, the display device with a CRT has drawbacks on its outer periphery that large distortion occurs, the display is out of focus, and the display size changes in accordance with the contents to be displayed and conditions under which the display is used. To obviate these drawbacks, this display device adopts a under-scan display scheme in which the effective display area is made one-size smaller than the aperture size of the display tube of CRT. Further, the monochromatic liquid crystal display is constructed so that the valid display area is kept to be substantially equal to the aperture size of the display, whereas in view of insufficient display quality the display format is made to be changeable between "black display on white background" and "white display on black background" whereby a user can select an easy-to-see display image.

SUMMARY OF THE INVENTION

FIG. 28 shows an arrangement of a conventional display apparatus with CRT. In FIG. 28, 1 is denotes vertical synchronization (sync) signal input terminal; 2 a horizontal sync signal input terminal; and 3 a video signal input terminal. A vertical deflection circuit 8 converts the vertical sync signal input from the terminal 1 into a vertical deflection signal; this vertical deflection signal is in turn supplied to the deflection coil 15 of a CRT 16 to execute the deflection scanning of electron beams in the vertical direction in the CRT. A horizontal deflection circuit 9 converts the horizontal sync signal input from the terminal 2 into a horizontal deflection signal; this horizontal deflection signal is in turn supplied to the deflection coil 15 of the CRT 16 to execute the deflection scanning of electron beams in the horizontal direction in the CRT. A signal processing circuit 13 subjects the video signal input from the terminal 3 to a signal processing such as black level setting and white level gain adjustment. The video signal subjected to such signal processing is supplied to a electron gun in CRT 16 through an output driver. The electron gun emits the corresponding electron beams to cause the fluorescent substance applied to the interior surface of the CRT to light up to display the video signal. In the case where the video signal is defined to be a positive analog signal of the rating of 1.0 Vp-p (terminated at 75Ω), the minimum level of the input video signal corresponds to black (no display), and the brightness produced corresponds to the signal level difference between the input video signal and the minimum level.

As described above, in order that any of the CRT display device and the liquid crystal display can be selected, the display area (valid display area) which can be controlled by a control device is made equal to the size of the background and that of the area where the data such as characters and figures are displayed. Thus, if "black display on white background" is executed in the CRT display device including a paper white CRT, the following problems occur since the size of the display tube is larger than the valid display area: (1) as seen from FIG. 15A, a black non-display portion is created in the periphery of the white background; (2) the characters and figures displayed near the periphery of the valid display area shrink; and (3) it is impossible to display the data (characters or figures) in the outermost side of the valid display area since the data is black and the portion around it is black. For example, the longitudinal line having a width of one dot cannot be recognized as a longitudinal line.

JP-A-60-134284 and JP-A-62-28791 disclose a display system in which a white area is displayed around the display area. If such a system is used, as shown in FIG. 15C, the white area is displayed around the display area exhibited in broken line so that the above problems can be solved. The system disclosed in both JP-A-60-134284 and JP-A-62-28791 is constructed so that the white area is created by a control device. Specifically, in the system disclosed in JP-A-60-134284, a signal for white area display is created using the memory address of a display memory in which display data are stored and a raster address for accessing a dot pattern memory. In the system disclosed in JP-A-62-28791, data indicative of the white area are stored as display data in a refresh memory. Therefore, in the case where the system is constructed such that the control device and the display device are separated from each other, the white area cannot be displayed unless the display device is connected with the control device having a function of creating the white area.

On the other hand, the above-mentioned prior art system which is adapted to be connectable with both paper white CRT display device and monochromatic liquid crystal display device does not take any consideration of causing both display devices to have the same function. Specifically, the monochromatic liquid crystal display device has a display inversion switch whereas the paper white CRT display device does not have the switch. Therefore, both display devices have different function regardless of that they are directed to the same white display device.

An object of the present invention is to provide a display device in which a video signal is added outside the display area on a display device side.

Another object of the present invention is to provide a display device which can make the function of a paper white CRT display device and that of a monochromatic liquid crystal display device the same.

The display device according to the present invention comprises means for adding a video signal outside a display area on the basis of a vertical sync signal and a horizontal sync signal so that the display area for the video signal received is enlarged. Thus, white background display can be added outside the display area on the display device side regardless of the construction of the control device.

BRIEF DESCRIPTION OF THE DRAWINGS

FIG. 11 is a circuit diagram of a concrete example of the video blanking circuit shown in FIG. 1;

FIG. 16 is a block diagram of another embodiment of the present invention;

DESCRIPTION OF THE PREFERRED EMBODIMENTS

Figure 1:
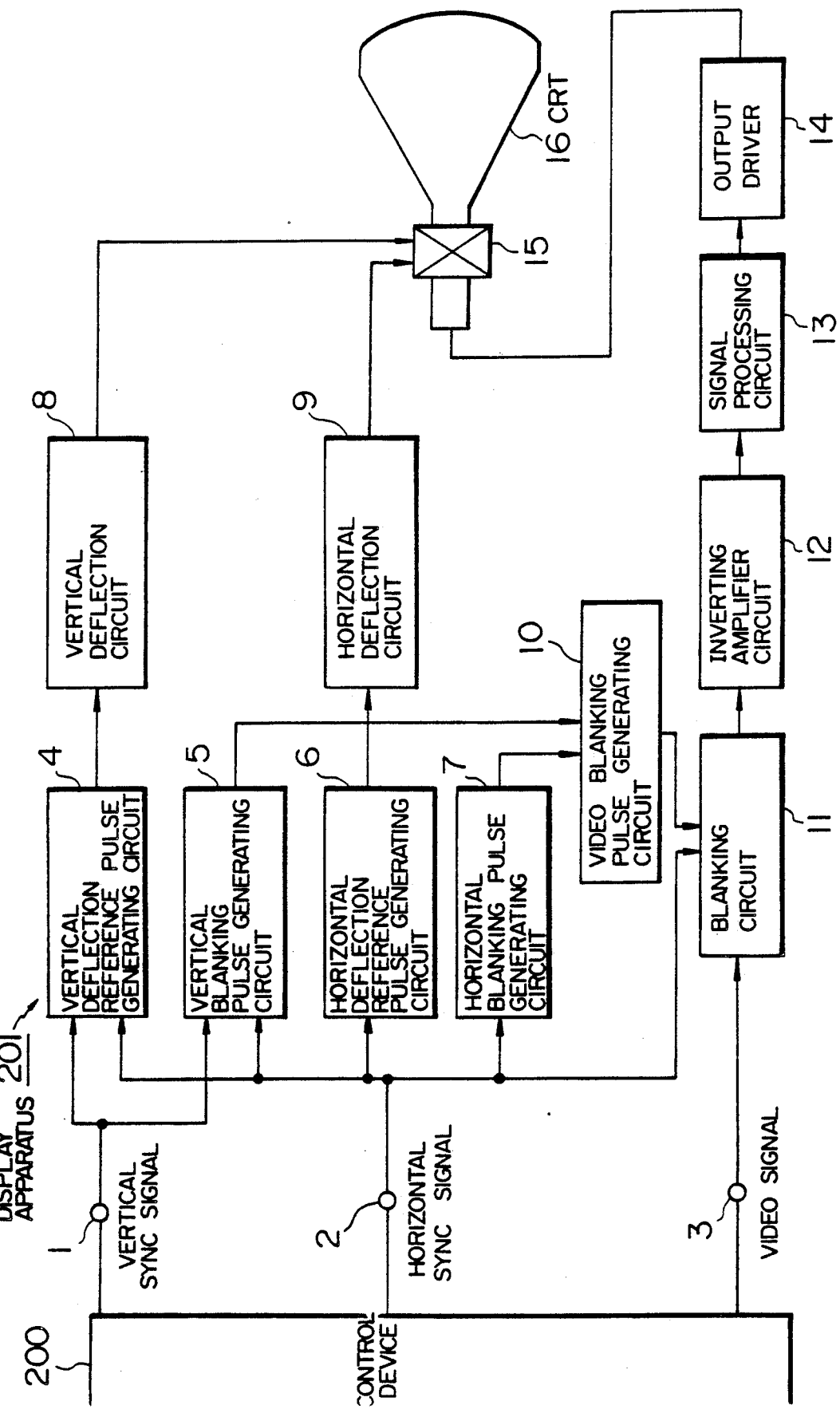
FIG. 1 is a block diagram showing one embodiment of the present invention.

Now referring to the drawings, several embodiments of the present invention will be explained in detail.

FIG. 1 shows an embodiment of the present invention. As seen from FIG. 1, a display apparatus 201 for which the present invention is intended is connected with a control device 200. The display apparatus 201 receives from the control circuit 200 a vertical sync signal, a horizontal sync signal and a video signal in synchronism with these sync signals. Terminal 1 is a vertical sync signal input terminal, terminal 2 is a horizontal sync signal input terminal and terminal 3 is a video signal input terminal. The vertical sync signal input from the terminal 1 is phase-corrected by a vertical deflection reference pulse generating circuit and converted into a vertical deflection signal by a vertical deflection circuit 8. The vertical deflection signal is supplied to a deflection coil 15 of a CRT 16 to execute the deflection scanning of electron beams in the vertical direction in the CRT. The horizontal sync signal input from the terminal 2 is phase-corrected by a horizontal deflection reference pulse generating circuit and converted into a horizontal deflection signal by a horizontal deflection circuit 9. The horizontal deflection signal is supplied to a deflection coil 15 of the CRT 16 to execute the deflection scanning of electron beams in the horizontal direction in the CRT. A vertical blanking pulse generating circuit 5 generates a vertical blanking pulse for the video signal on the basis of the vertical sync signal and the horizontal sync signal. A horizontal blanking pulse generating circuit 7 generates a horizontal blanking pulse for the video signal on the basis of the horizontal sync signal. A video blanking pulse generating circuit 10 synthesizes a video blanking pulse from the vertical blanking signal pulse and the horizontal blanking signal pulse. The video signal input from the terminal 3 is blanking-processed by a blanking circuit 11, positive-negative inverted by an inverting amplifier circuit 12, subjected to signal processings such as black level setting and white level gain adjustment by a signal processing circuit 13, and supplied via an output driver 14 to the electron gu of the CRT 16 to provide the corresponding electron beam. The electron beam emitted from the electron gun causes the fluorescent substance applied on the interior surface of the CRT tube to light up to display the video signal.

This embodiment is directed to the display device of interlaced scanning type with a valid display area of horizontal 1120 dots × vertical 780 dots. The signal in this embodiment corresponds to 18.9 μs for each dot.

Figure 2:
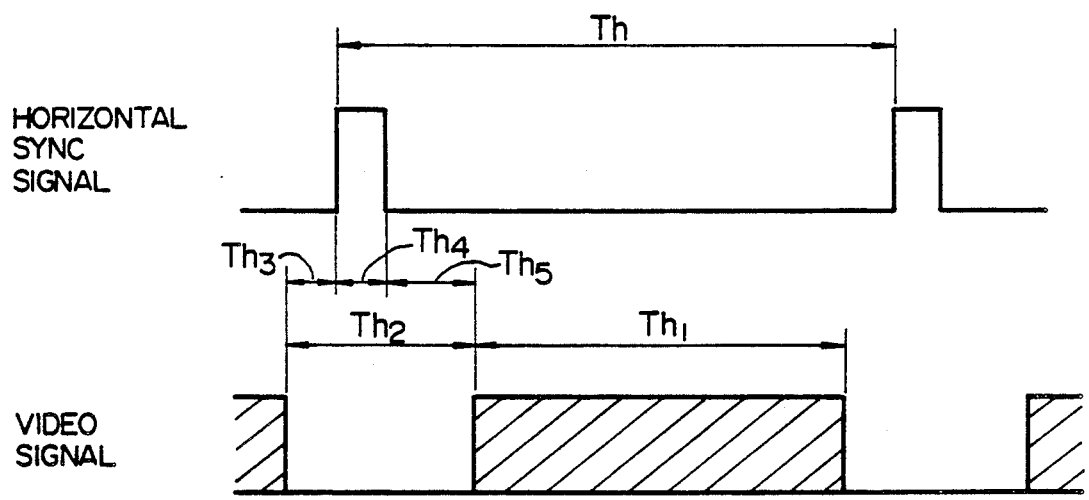
FIG. 2 is a timing chart showing the phase relationship between a horizontal sync signal and a video signal.

FIG. 2 shows the phase relationship between the horizontal sync signal and the video signal. In FIG. 2, the horizontal cycle (Th) is 29.63 μs=1568 dots; the horizontal valid display period (Th1) is 21.17 μs=1120 dots; the horizontal blanking period (Th2) is 8.47 μs=6 dots; the horizontal sync signal width (Th4) is 2.65 μs=140 dots; and the horizontal back porch (Th5) is 4.76 μs=252 dots.

Figure 3:
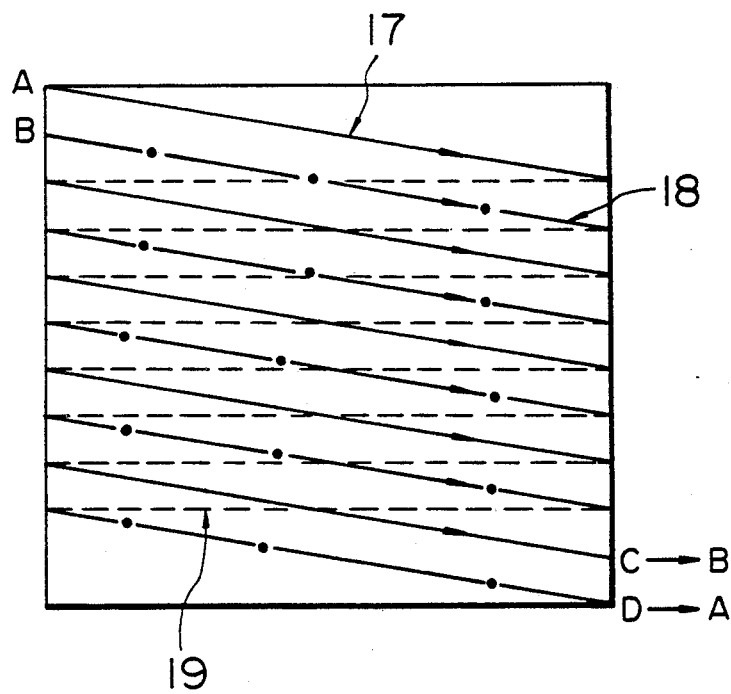
FIG. 3 is a view showing the screen in an interlace system.

FIG. 3 shows the screen scanned with interlaced scanning. In FIG. 3, solid lines 17 and dotted broken lines 18 represent scanning lines during a display period and broken lines represent scanning lines during a horizontal blanking period. Although not shown, the period between C and B and between D and A represent vertical blanking periods. The interlaced scanning constitutes one screen by executing vertical scanning twice. The screen formed by executing the vertical scanning once is a field. The complete screen consisting of two fields is a frame. The solid lines 17 represent the scanning lines for a even field whereas the dotted broken lines 18 represent the scanning lines for an odd field. In order to form a satisfactory screen in the interlaced scanning, the scanning lines for the even field and odd field must be located intermediately between each other, and so the relation Tv=(N+1/2)×Th (Tv: vertical cycle, Th: horizontal cycle, N: natural number) must be satisfied.

Figure 4:
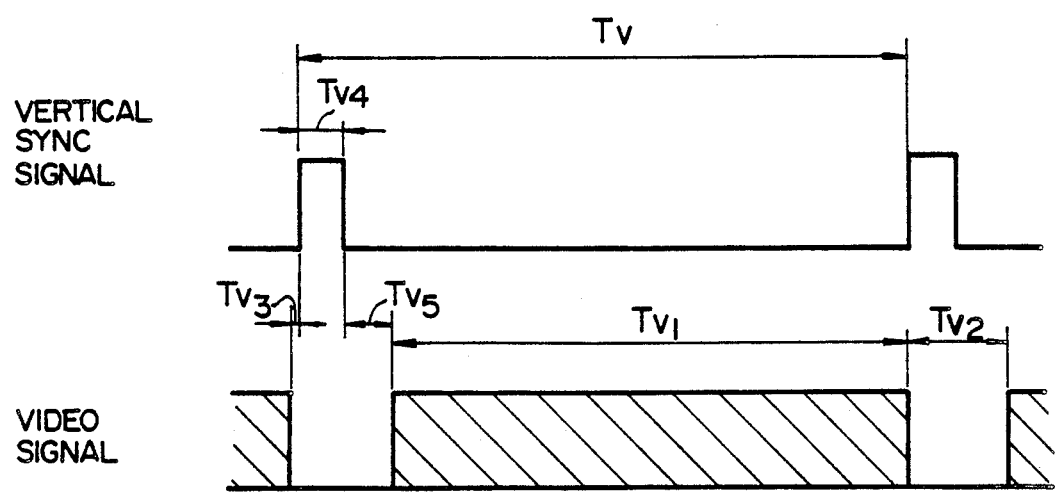
FIG. 4 is a timing chart showing the phase relationship between a vertical sync signal and a video signal.

FIG. 4 shows the phase relationship between the vertical sync signal and the video signal. In FIG. 4, the vertical cycle (Tv) is 12.46 ms=420.5 H (H corresponds to the horizontal cycle Th); the vertical valid display period (Tv1) is 11.56 ms=390 H; the vertical blanking period (Tv2) is 918.6 μs=31H/889.0 μs=30 H; the vertical front porch (Tv3) is 21.17 μs =0.5 H+336 dots/6.35 μs=0H+336 dots; the vertical sync signal width (Tv4) is 474.1 μs=16 H; and the vertical back porch (Tv5) is 423.4 μs=14.5 H=336 dots/408.5 μs=14 H−336 dots. The reason why the vertical blanking period, the vertical front porch and the vertical back porch have two values, respectively is that the value when shifting from the odd field to the even field is different from that when shifting from the even field to the odd field. They are indicated in the form of the value when shifting from the odd field to the even field/the value when shifting the even field to the odd field, and also are the values for the rising edge of the horizontal sync signal.

Figure 5A:
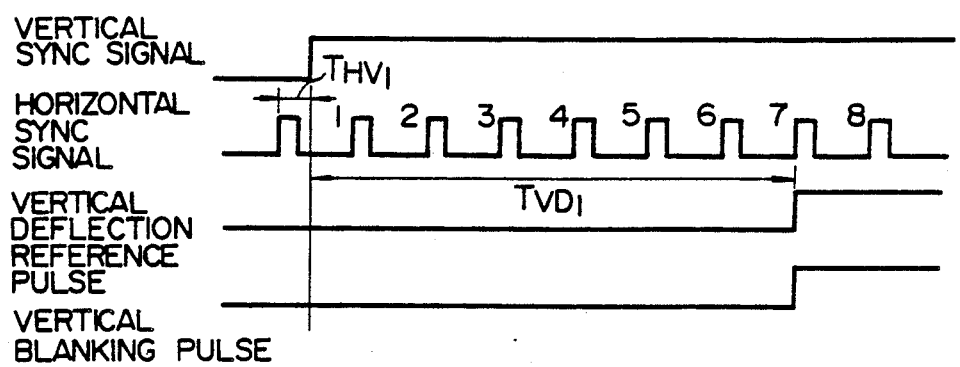
FIGS. 5A to 5D are timing charts showing the relationship among a vertical sync signal, a vertical deflection reference pulse, a vertical blanking pulse and a horizontal blanking pulse.
Figure 5B:
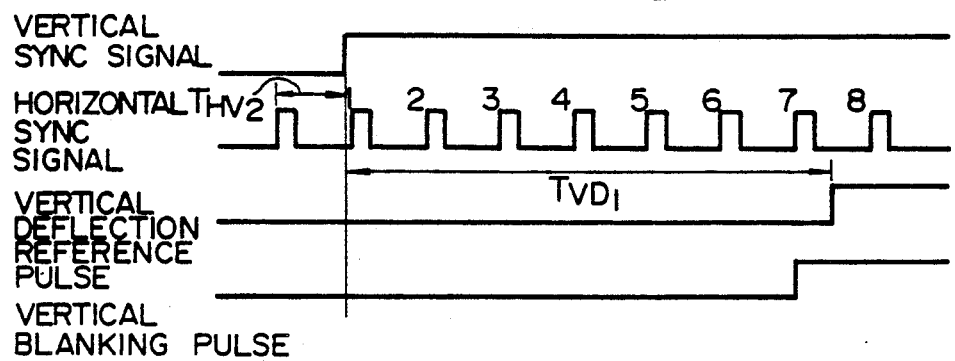
Figure 5C:
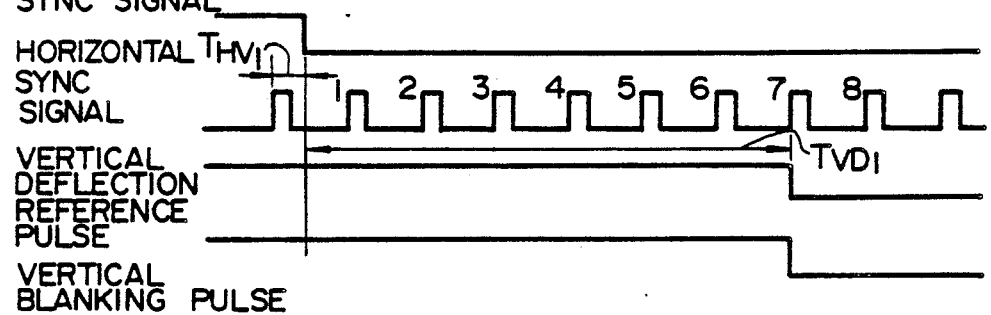
Figure 5D:
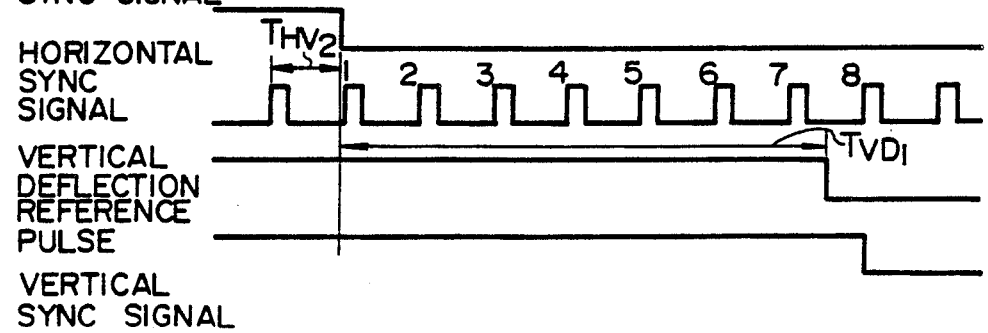

FIGS. 5A to 5D show the relationship among the vertical sync signal, the vertical deflection reference pulse, and the vertical blanking pulse, respectively. In all of FIGS. 5A to 5D, the waveforms are shown in the order of the vertical sync signal, the horizontal sync signal, the vertical deflection reference pulse, and the vertical blanking pulse from the top FIGS. 5A and 5C show the waveforms when shifting from the even field to the odd field; FIG. 5A shows the waveform at the time of rising of the vertical sync signal and FIG. 5C shows those at the time of falling of the vertical sync signal. FIGS. 5B and 5D show the waveforms when shifting from the odd field to the even field; FIG. 5B shows the waveforms at the time of rising of the vertical sync signal and FIG. 5D shows those at the time of falling of the vertical sync signal. The vertical deflection reference pulse generating circuit 4, in response to inputting of the vertical sync signal and horizontal sync signal, generates a reference pulse in the phase of scanning/blanking for the vertical deflection circuit 8; the circuit 4 generates a pulse which is started at the timing delayed from the vertical sync signal by a predetermined time (TVD1) and persists for a predetermined time (TVD2). The vertical blanking pulse generating circuit 5, in response to inputting of the vertical sync signal and horizontal sync signal, generates the vertical blanking pulse signal for video blanking; the vertical blanking pulse is started to be outputted between the completion of the vertical display period and the start of outputting of the vertical deflection pulse and terminated between the completion of output of the vertical deflection reference pulse and the start of the vertical display period. Now it should be noted that if the vertical blanking pulse is changed while the horizontal sync signal is '0', i.e. during the horizontal scanning period, the background added outside the valid display period described later starts or terminates in the middle of the screen. Therefore, in order that the background starts from the left end and terminates at the right end, the vertical blanking pulse must change while the horizontal sync signal is '1', i.e. during the horizontal blanking period, specifically, the outputting of the pulse must start between the completion of the vertical display period and the start of outputting of the vertical deflection reference pulse and while the horizontal sync signal is '1' and also must terminate between the completion of outputting of the vertical deflection reference pulse and the start of the vertical display period and while the horizontal sync signal is '1'.

The width (TVD2) of the output vertical deflection pulse must be equal to or longer than the minimum value (TVD0) required for the vertical deflection circuit to execute the blanking operation of electron beams in the vertical direction of the CRT; namely the equation TVD2≧TVD0 must be satisfied. In this embodiment, TVD0=16 H and TVD2=16H. The phase differences of the vertical sync signal from the horizontal sync signal are set as THV1=6.35 μs (336 dots) and THV2=21.17 μs (0.5 H+336 dots). The delay time of the vertical deflection reference pulse from the input vertical sync signal is set as TVD1=201.1 μs (7H−336 dots).

Figure 6A:
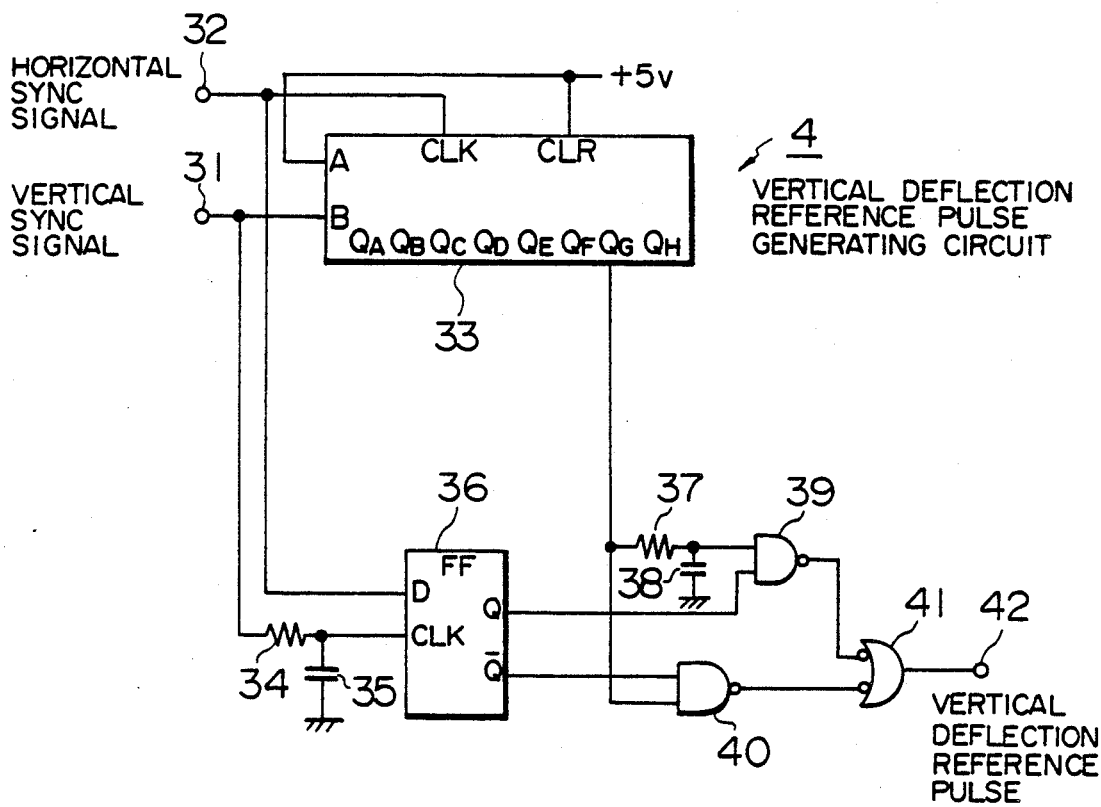
FIGS. 6A and 6B are circuit diagrams showing concrete examples of the vertical deflection reference pulse generating circuit shown in FIG. 1, respectively.
Figure 6B:
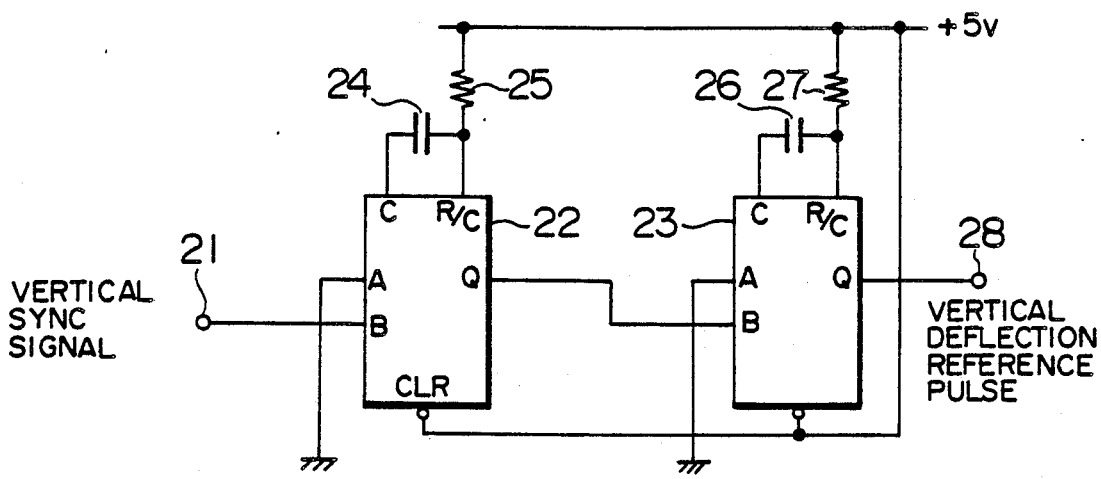

FIGS. 6A and 6B show a concrete example of the vertical deflection reference pulse generating circuit 4, respectively.

The circuit of FIG. 6A uses a shift register 33 whose typical example is 74LS164. In FIG. 6A, terminal 31 is a vertical sync signal input terminal; terminal 32 is a horizontal sync signal input terminal; and terminal 42 is a vertical deflection reference pulse output terminal. The QG output of the shift register 33 becomes "H"/"L" in synchronism with inputting of the seventh CLK or the rising edge of the horizontal sync signal after the B input becomes "H"/"L". As described above, since the interlaced scanning is carried out in this embodiment, the difference of the transition timing of the vertical sync signal from that of the horizontal sync signal varies such as THV2 (21.17 μs)/THV1 (6.35 μs) depending on the field change being from even to odd number or odd to even number, as shown in FIG. 5B, FIGS. 5D and 5A, and FIG. 5C, and thus the time from transition of the vertical sync signal to transition of the QG output varies such as 186.3 μs/201.1 μs. Therefore, if the vertical sync signal is delayed from 8.47 μs (1568−1120=448 dots) to 11.1 μs (448+140=648 dots) using a resister 34 and a capacitor 35, the horizontal sync signal at the timing of transition of the vertical sync signal is "H" in the odd-to-even field change whereas it is "L" in the even-to-odd field change. Accordingly, it can be decided which field change now occurs using a D type flip-flop (e.g. 74L74). With the even-to-odd field change as shown in FIGS. 5A and 5C, the negative logic output Q terminal of the D flip-flop 36 is at "H" so that the QG output of the shift register 33 is output as it is from the terminal 42. On the other hand, with the odd-to-even field change as shown in FIGS. 5B and 5D, the positive logic output Q terminal is "H" so that the QG output of the shift register 33 is delayed by 14.82 μs=0.5 H by a delay circuit consisting of a resistor 37 and a capacitor 38. The delayed QG output is output from the terminal 42. Thus, the vertical deflection reference pulse having a pulse width of 16 H which is delayed by 201.1 μs from transition of the vertical sync signal can be generated.

The vertical deflection reference pulse generating circuit of FIG. 6B uses a multi-vibrator (e.g. 74LS123). It should be noted that this circuit does not require the horizontal sync signal. In FIG. 6B, terminal 21 is a vertical sync signal input terminal and terminal 28 is a vertical deflection reference pulse output terminal. In multi-vibrators 22 and 23, whose A input is set for "H", its Q output becomes "H" after the rising edge of a B input and changes into "L" after elapse of a prescribed time (t=0.45 RC) determined by constants of a resistor and capacitor connected with an R terminal and an R/C terminal. In this case, if the respective values R and C of a resistor 24 and a capacitor 25 are set so as to provide t=201.1 μs, and those of a resistor 26 and a capacitor 27 are set so as to provide t=474.1 μs (16 H) the vertical deflection reference pulse having a pulse width of 16 H and delayed by 201.1 μs from transition of the vertical sync signal can be generated as shown in FIGS. 5A to 5D.

Figure 7:
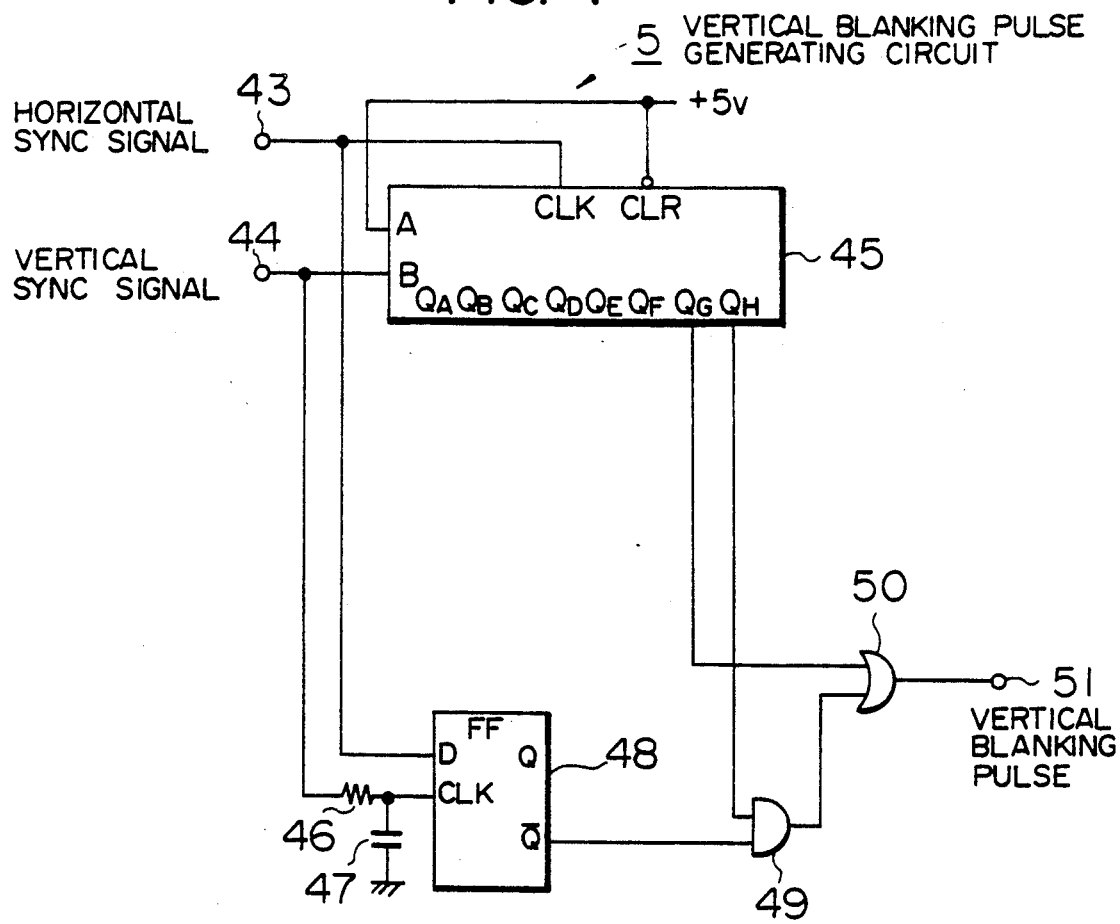
FIG. 7 is a circuit diagram showing a concrete example of the vertical blanking generating circuit shown in FIG. 1.

FIG. 7 shows a concrete example of the vertical blanking pulse generating circuit 5 using a shift register 45 whose typical example is 74LS164 as in FIG. 6A. In FIG. 7, terminal 43 is a horizontal sync signal input terminal; terminal 44 is a vertical sync signal input terminal; and terminal 51 is a vertical blanking pulse output terminal. The vertical blanking pulse to be generated in this example changes in synchronism with the rising edge of the eighth horizontal signal from the fall of the vertical sync signal for only the fall of the vertical sync signal in the odd-to-even field change, as shown in FIGS. 5A to 5D, and changes in synchronism with the rising edge of the seventh horizontal sync signal from transition of the vertical sync signal for other cases. Therefore, as in the vertical deflection reference pulse generating circuit shown in FIG. 6A, the delay circuit consisting of a resistor 46 and a capacitor 47 and a field-change decision circuit using a D-type flip-flop 48 (e.g. 74LS74) for deciding field change are used to provide a QH output from the shift register 45 for only the fall of the vertical sync signal in the odd-to-even field change and a QG output in other cases, thus generating the vertical blanking pulse.

Returning to FIG. 1, the horizontal deflection reference pulse generating circuit 6, in response to inputting of the horizontal sync signal, generates a reference pulse in the phase of scanning/blanking for the horizontal deflection circuit 9, the output of the pulse generating circuit is started at the timing in phase of the horizontal sync signal or delayed a predetermined time (THD1) and persists for a predetermined time (THD2). Additionally, the output pulse width (THD2) of the horizontal deflection reference pulse must be equal to or longer than the minimum value (THD0) required for the horizontal deflection circuit to execute the blanking operation of electron beams in the horizontal direction of the CRT; namely the equation $THD2 \geq THD0$. In this embodiment, $THD0 = 2.65$ μs so that the horizontal sync signal is used as the horizontal deflection reference pulse as it is.

Figure 8:
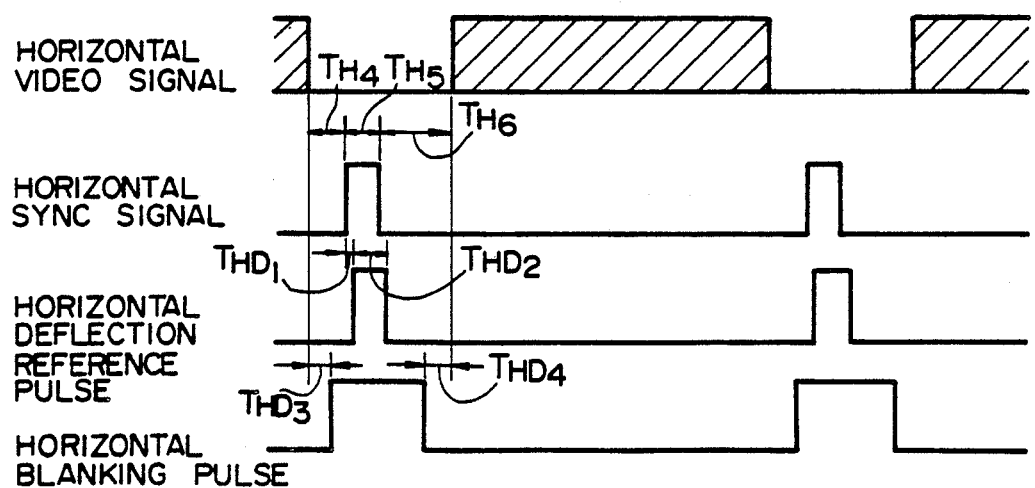
FIG. 8 is a timing chart showing the relationship between a horizontal video signal, a horizontal sync signal, a horizontal deflection reference pulse and a horizontal blanking pulse.

The horizontal blanking pulse generating pulse circuit 7, in response to inputting of the horizontal sync signal, generates a horizontal blanking pulse for video blanking. FIG. 8 shows the relationship among the horizontal video signal, the horizontal sync signal, the horizontal deflection reference pulse and the horizontal blanking pulse. The waveforms are shown in that order from the top. The shaded portion of the horizontal video signal corresponds to the display period (valid display area) of an input video signal. The horizontal blanking pulse is a pulse whose output is started after a predetermined time (THD3) from completion of the horizontal display period between completion of the horizontal display period and start of the output of the horizontal deflection reference pulse and is terminated before a predetermined time (THD4) from start of the horizontal display period between completion of the output of the horizontal deflection reference pulse and start of the horizontal display period. In other words, the pulse width of the horizontal blanking pulse is shorter than the interval between the respective horizontal video display signals (periods). In this example, the output of the horizontal blanking pulse is started in phase with that of the horizontal sync signal, and the above predetermined times are set as $THD3 = THD4 = 1.06$ μs = 56 dots.

Figure 9:
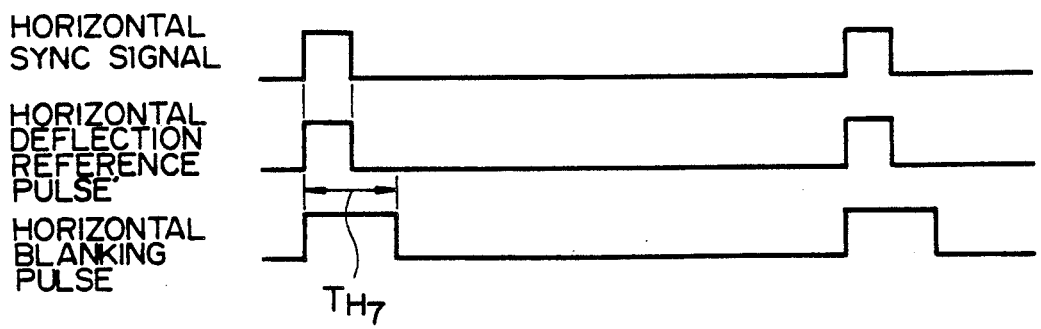
FIG. 9 is a timing chart showing the relationship among a horizontal sync signal, a horizontal deflection reference pulse and a horizontal blanking pulse in this embodiment.

FIG. 9 shows the relationship among the horizontal sync signal, the horizontal deflection reference pulse and the horizontal blanking pulse. The waveforms are shown in that order from the top. The horizontal deflection pulse is in phase with the horizontal sync signal. The horizontal blanking pulse, whose output is started simultaneously with that of the horizontal sync signal, has a pulse width of 6.35 μs=horizontal blanking period $(Th2) - (THD3) + (THD4) = 448$ dots.

Figure 10A:
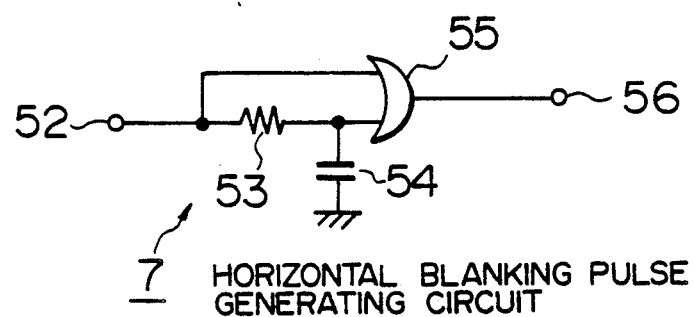
FIGS. 10A and 10B are circuit diagrams showing concrete examples of the horizontal blanking pulse generating circuit, shown in FIG. 1, respectively.
Figure 10B:
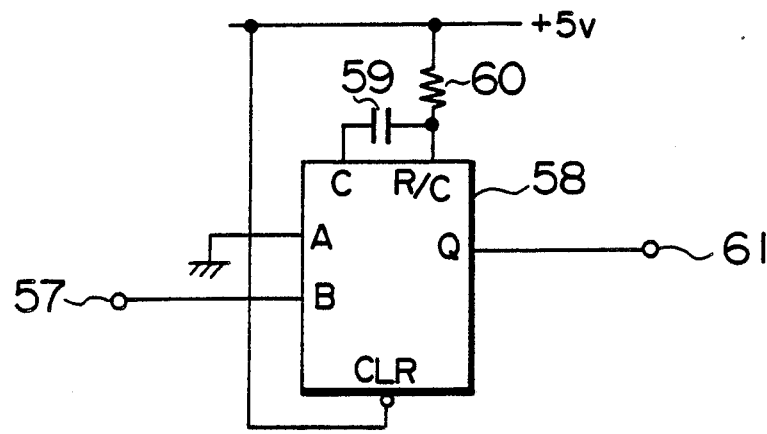

FIGS. 10A and 10B show concrete examples of the horizontal blanking pulse generating circuit 7.

In FIG. 10A, a terminal 52 is a horizontal sync signal input terminal and a terminal 56 is a horizontal blanking pulse output terminal. The horizontal sync signal is delayed by 6.35−2.65=3.70 μs (196 dots) using a delay circuit consisting of a resistor 53 and a capacitor 54; the horizontal sync signal and the delayed signal are logic-ORed by an OR gate circuit 55 (e.g. 74LS32) to generate a horizontal blanking pulse.

The circuit of FIG. 10B uses a multi-vibrator (e.g. 74LS123) 58. In FIG. 10B, a terminal 57 is a horizontal sync signal input terminal and a terminal 61 is a horizontal blanking pulse output terminal. In the multi-vibrator 58, its Q output becomes "H" at the rising edge of a B input signal or horizontal sync signal and changes into "L" after a prescribed time (0.45 RC) determined from constants of a resistor 60 and a capacitor 59, thereby producing a horizontal blanking pulse.

The video blanking pulse generating circuit 10 synthesizes and generates a video blanking pulse from a horizontal blanking pulse and a vertical blanking pulse. This video blanking pulse is obtained by logic-ORing the horizontal blanking pulse and the vertical blanking pulse by an OR gate (e.g. 74LS32).

The blanking circuit 11, in response to inputting of a video signal and a video signal blanking pulse, serves to execute the blanking for the video signal. FIG. 11 shows a concrete example of the blanking circuit 11. In FIG. 11, a terminal 62 is a power input terminal; a terminal 63 is a video signal input terminal; a terminal 64 is a video blanking pulse input terminal; and a terminal 79 is a blanking circuit output terminal.

The operation of the blanking circuit 11 will be explained with reference to the waveform charts of FIGS. 12A and 12B. The video signal used in this embodiment is a positive analog signal with the rating of 1.0 Vp-p (when terminated with 75Ω).

Figure 12A:
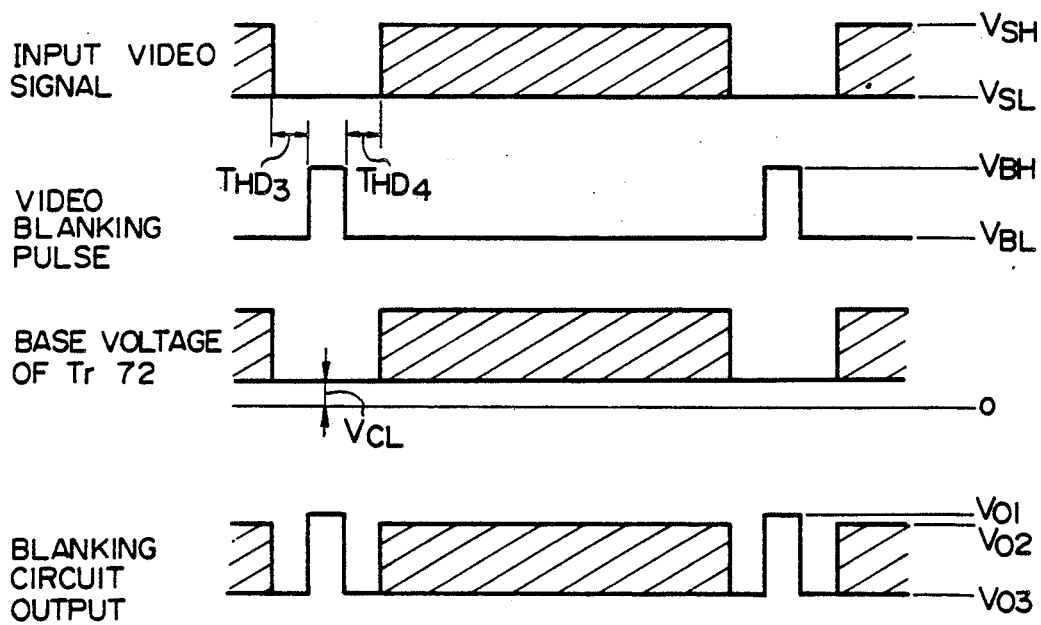
FIGS. 12A and 12B are waveform charts indicative of the operation of the video blanking circuit.

The waveforms shown in FIG. 12A, which intends to indicate the operation of a horizontal cycle, are an input video signal, a video blanking pulse, the base voltage of a transistor 72 and a blanking circuit output signal. A resistor 80, which is the terminating resistor for a transmission line, has a resistance of 75Ω. The highest level (VSH) of the video signal—the lowest level (VSL) thereof=1 V. A transistor 66 and a resistor 65, which constitute an emitter-follower, executes impedance conversion of an input video signal. A transistor 71 turns ON/OFF in accordance with "H"/"L" of the video blanking pulse. The transistor 71 constitutes a clamping circuit together with a capacitor 67. The clamping circuit clamps the voltage of the input video signal during the phase corresponding to the "H" period of the video blanking pulse at the voltage VCL determined by the resistance ratio among resistors 76, 77 and 78 connected with the emitter of the transistor 71 (VCL=(R77B+R78) ×VCC/(R76+R77+R78), and clamps that during the phase corresponding t the "L" period of the video blanking pulse at the voltage relatively DC-shifted from the voltage VCL owing to the storage voltage in the capacitor 67. The video signal thus clamped is supplied to the base of a transistor 72. The transistor 72 constitutes a clipping circuit together with a transistor 73 and a resistor 74; the emitter voltage is determined by a higher one of the base voltages of the transistors 72 and 73. Therefore, if the signal obtained by level-changing the video blanking pulse using resistors 68 and 69 is supplied to the base of the transistor 73 so as to set VCL≧VBE+(VBL×R69)/(R68+R69), and VCL≦VBE+(VBH×R69)/(R68+R69), the emitter voltage of the transistors 73 and 74 which is a blanking circuit output signal, as shown by the fourth waveform from the top in FIG. 12A, becomes the voltage determined by "H" level (VBH) of the video blanking pulse during the "H" period thereof and by the voltage level of the input video signal during the "L" period of the video blanking pulse.

The input/output relation in the blanking circuit 12 is summarized as follows:

① During "H" period of the video blanking pulse $$V01 = (VBH \times R69)/(R68 \times R69) - VBE \geq VCL - 2VBE$$

② During "L" period of the video blanking pulse $$VOUT = (VS - VSL) + VCL - VBE$$

The highest signal level:

$$V02 = (VSH - VSL) + VCL - VBE$$
$$= 1.0 + VCL - VBE$$

The lowest signal level:

$$V03 = (VSL - VSL) + VCL - VBE = VCL - VBE$$

Additionally, as is understood from the description of the horizontal blanking pulse generating circuit 7, the output video signal of the blanking circuit 11 is a signal obtained by adding a signal of 56 dots (THD3, THD4) before and after the horizontal display period (valid display area) shown by hatching in FIG. 12A. The level VS of the added signal is VSL. In this embodiment, the values of R68, R69 and those of R76, R77 and R78 are set so that V01=V02.

Figure 12B:
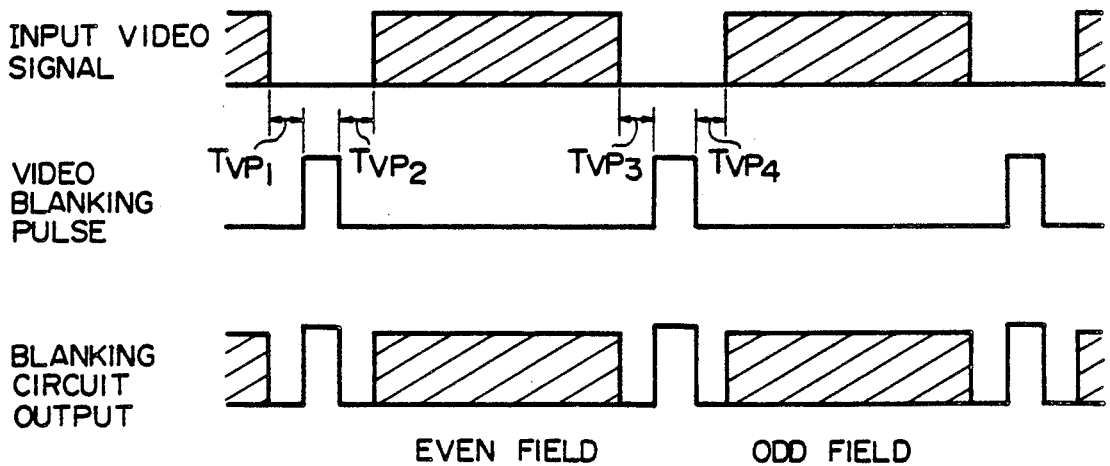

FIG. 12B shows the operation in a vertical cycle. In the figure, shown from the top are an input video signal, a video blanking pulse and a blanking circuit output signal. As to the horizontal cycle, the output video signal of the vertical blanking pulse generating circuit 11 is a video signal obtained by adding a signal of 7H (TVP1=7H, TVP2=−15H−8H, TVP3=−7H and TVP4=−14H−7H) before and after the vertical display period (valid display area) shown by hatching in FIG. 12B. The level of the added signal is VSL.

Figure 13:
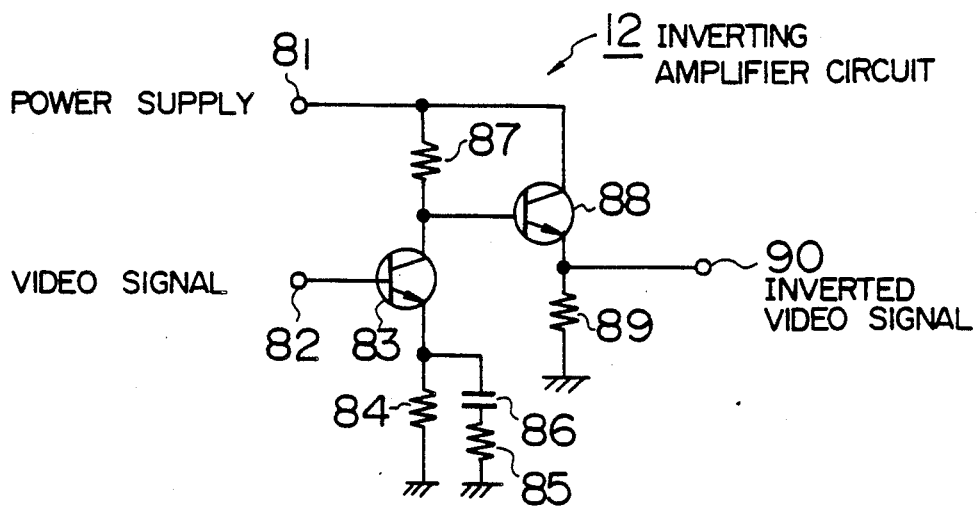
FIG. 13 is a circuit diagram showing an example of a concrete example of the inverting amplifier circuit shown in FIG. 1.

The inverting amplifier circuit 12 inverts the polarity of the output signal from the blanking circuit 11 to change the highest level (VSH) and lowest level (VSL) of the input video signal into the lowest level (VRL) and highest level (VRH) of the output from the circuit 12, respectively. FIG. 13 is a concrete example of the inverting amplifier circuit 12. In FIG. 13, a terminal 81 is a power supply input terminal; a terminal 82 is a video signal input terminal; and a terminal 90 is a video signal output terminal. A transistor 83 serves as a common-emitter inverting amplifier circuit having an input/output gain AV=−R87/R84. A capacitor 86 and a resistor 85 are also provided to correct a high frequency gain. In this embodiment, the voltage gain of the previous stage blanking circuit 11 is 1 so that the resistance of R87 and R84 are set so as to provide R87=R84. A transistor 88, which constitutes an emitter follower together with a resistor 89, impedance-inverts the inverted video signal so that it will not be influenced by the succeeding stage.

The input/output relation in the inverting amplifier 12 is as follows.

$$VR = VCC - R87 \times (Vin - VBE)/R84 -$$
$$VBE = VCC - Vin$$

where VR: an inverting circuit inverting circuit input.

Figure 14:
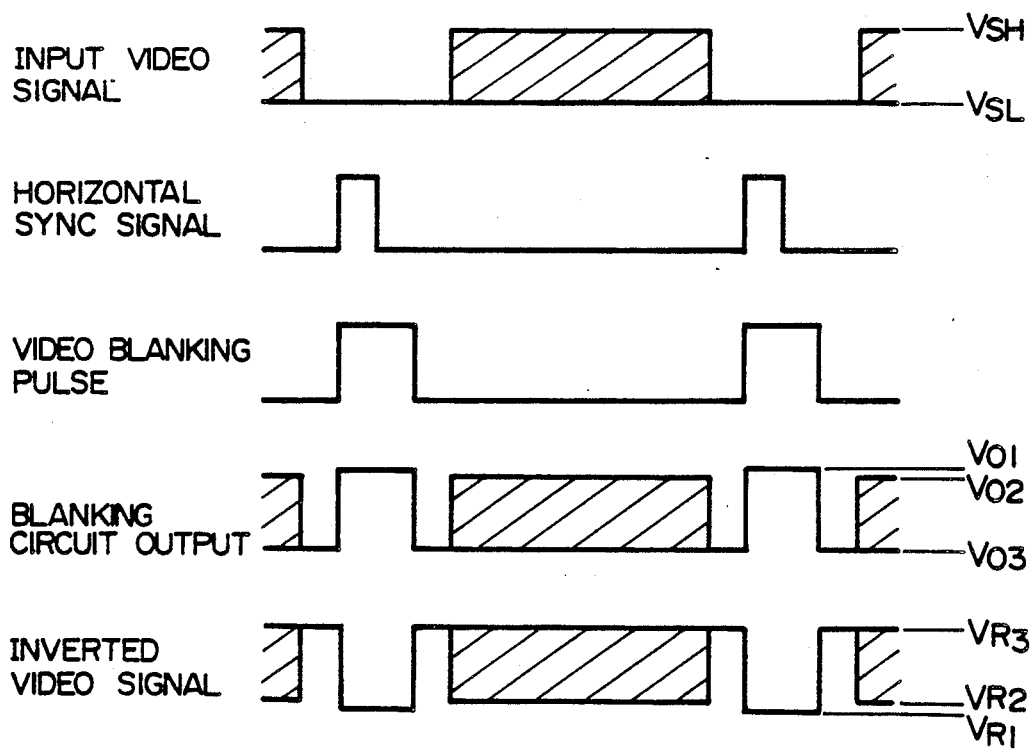
FIG. 14 is a waveform chart indicative of the operation of the inverting amplifier circuit.

FIG. 14 shows the waveforms indicative of the operation in a horizontal cycle from the input video signal to the inverted video signal in this embodiment; shown in order from the top are the waveforms of the input video signal, the horizontal sync signal, the video blanking pulse, the blanking circuit output signal and the inverted video signal. The inverted video signal varies an follows:

①  During the "H" period of the video blanking pulse, $$VR1 = VCC - V01$$

②  During the "L" period of the video blanking pulse, the highest input signal level:

$$VR2 = VCC - V02$$
$$= VCC - (1.0 + VCL - VBE)$$

the lowest input signal level:

$$VR3 = VCC - V03$$
$$= VCC - (VCL - VBE)$$

In this embodiment, V01=V02 so that VR1=VR2. Thus, during the "H" period of the video signal pulse, the video signal provides the lowest input signal level; during the period over 56 dots (horizontal direction) and 7H (vertical direction) applied before and after the valid display area, respectively; it provides the highest input signal level; and during the valid display area, it provides the inverted signal of the input video signal. As seen from the waveform of the inverted video signal shown in FIG. 14, it has the waveform in which white display video signal is added before and after the shaded video signal.

Figure 15A:
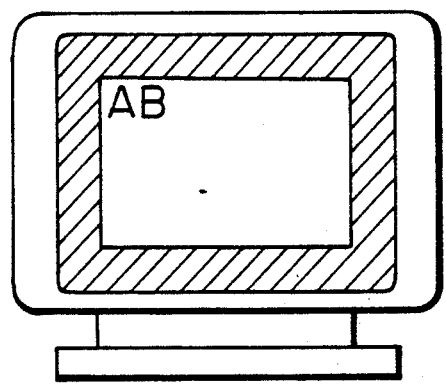
FIGS. 15A to 15C are views showing the display formats of CRT displays, respectively.
Figure 15B:
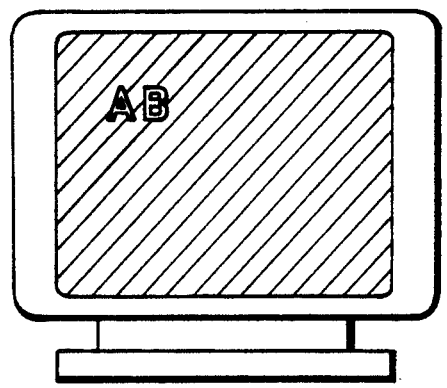
Figure 15C:
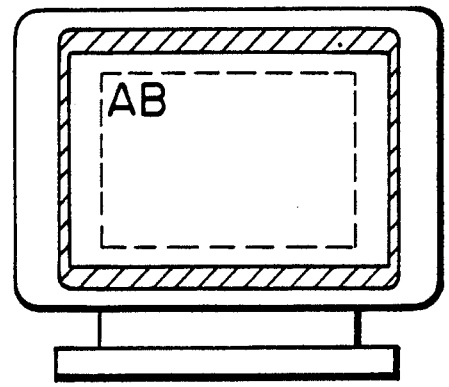

As seen from FIG. 1, the inverted video signal supplied to the signal processing circuit 13 as an input signal of the CRT display device will be sent to the electron gun of the CRT 16 through the output driver 14. Thus, as shown in FIG. 15C, a brightest white portion (left and right; 56 dots (total 112 dots), up and down; 7H (total 14H)) is added outside the valid display area. The inverted video signal is a positive analog signal within the valid display area. When input with the rating of 1.0 Vp-p (terminated at 75Ω), the lowest level of the input video signal represents white (brightest) whereas the highest level thereof represents black (no display); the level difference of the input level from the highest level indicates the brightness displayed.

If the control program providing the display format of 'background: black, character/figure: green normal display (green display on a black background)' for the green CRT is input to the white CRT according to this embodiment, the display format results in 'background: white, character/figure: reverse display of black (black display on a white background)' and a background the size (horizontal 1232 dots × 808 dots) of which is one-size larger than the valid display area (horizontal 1120 dots × vertical 780 dots). Thus, without making any particular change for the control program, the display format of 'background: white, character/figure: reverse display of black (black display on a white background)' can be realized. Also when the data (a character and/or a figure) is displayed at the outermost periphery of the display area (valid display area) which can be controlled by a control device, the following advantages can be obtained because of clearance of the background located outside the valid display area. (1) As seen from FIG. 15C, a black non-display portion around the white background can be reduced. (2) The characters and figures displayed near the periphery of the valid display area do not shrink. (3) It is possible to display the data (characters or figures) in the outermost periphery of the valid display area since the data is black but a white background is still located around the valid display area; an example in which segments are displayed in the outermost periphery of the valid display area is shown by a broken line in FIG. 15C. Additionally, in the case of a 15-inch CRT display device, the aperture size of CRT is horizontal 289 mm × vertical 210 mm; the valid display area is horizontal 260 mm × vertical 181 mm; and the background extended according to this embodiment of the present invention is vertical 286 mm × vertical 187 mm.

FIG. 16 shows another embodiment of the present invention in which a changeover switch 91 for signal switching is added to the embodiment of FIG. 1. The changeover switch 91 is used to change the video signal to be supplied to the signal processing circuit 13 between the video signal from the terminal 3 and the inverted video signal output from the inverting amplifier circuit 12. When a positive analog signal with the rating of 1.0 Vp-p (terminated at 75Ω) is input, the display format can be changed between ①  'white display on a black background' in which the lowest level of the input video signal represents black (no display) whereas the highest level thereof represents white (brightest), and the brightness displayed is represented by the level difference of the input video signal from the lowest level, as shown in FIG. 15B; and ②  'black display on a white background' in which the lowest level of the input video signal represents white (brightest) whereas the highest level thereof represents black (no display), and the brightness displayed is represented by the level difference of the input video signal from the highest level, as shown in FIG. 15C.

Figure 17:
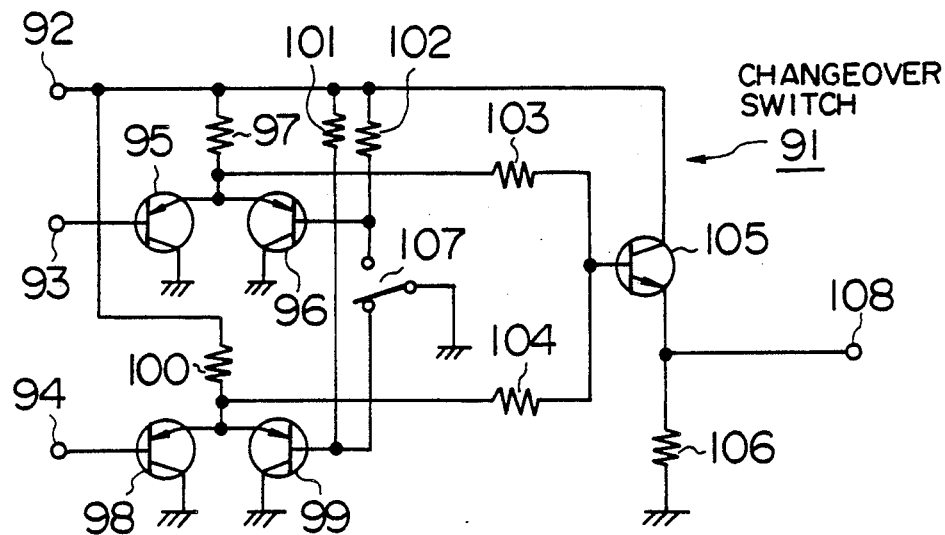
FIGS. 17 and 18 are circuit diagrams showing concrete examples of a switching circuit.

FIG. 17 shows a concrete example of the changeover switch 91. The switch 91 may be a mechanical switch which directly switches a video signal, but the mechanical switch, when provided at a position operable from the exterior, frequently extends the path of the video signal; this leads to problems of noise, crosstalk and deterioration of a frequency characteristic, etc. For this reason, in most cases, an electronic switch as shown in FIG. 17 is used instead of the mechanical switch. In FIG. 17, a terminal 92 is a power supply input terminal; a terminal 93 is a video signal input terminal; a terminal 94 is an inverted video signal input terminal; and 108 denotes a switch circuit output terminal. Transistors 95 and 96 and a resistor 97 constitute a clipping circuit. This circuit operates to determine the emitter voltage by a lower one of the base voltages of the transistors 95 and 96. Therefore, when the base voltage of the transistor 96 is on the side of ground, the emitter voltage is determined by the base voltage of the transistor 96, whereas when the base voltage of the transistor 96 is on the side of the power supply voltage, the emitter voltage is determined by the base voltage of the transistor 96 which comes from the input video signal.

Transistors 98 and 99 and a resistor 100 also constitute a clipping circuit which operates in the same manner as described above. The switching operation of the switch 107 permits one of the transistors 96 and 98 to be set for the grounding side and the other thereof to be set for the power supply side. Therefore, either of the video signal from the terminal 93 and the inverted video signal from the terminal 94 is supplied to the base of a transistor 105 in accordance with the state of the switch 107. A transistor 105 and a resistor 106 constitute an emitter follower which serves to impedance-change the inverted video signal so that it is not influenced by the subsequent stage. Either of the input video signal and the input inverted video signal, selected by the switch 107, is output from the terminal 108.

Figure 18:
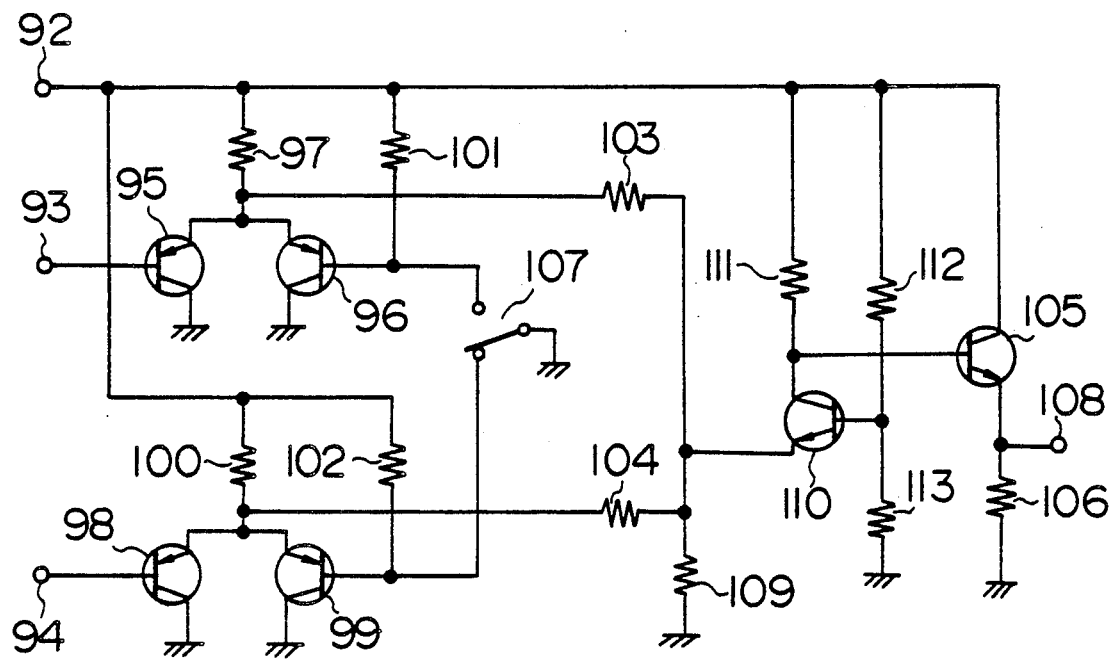

Now it should be noted that the input/output voltage gain is determined by the ratio of the resistances of resistors R103 and R104. In this embodiment, these values are set as R103=R104 so that the input video signal and the input inverted video signal provide equal voltage gains; thus $Av=\frac{1}{2}$. Although this level reduction can be absorbed by the signal processing circuit 13 at the subsequent stage, the input/output voltage gain of $Av=1$ can be provided using a common-base amplifier constituted by a transistor 110 as shown in FIG. 18 which is to be added to the circuit of FIG. 17.

Figure 19:
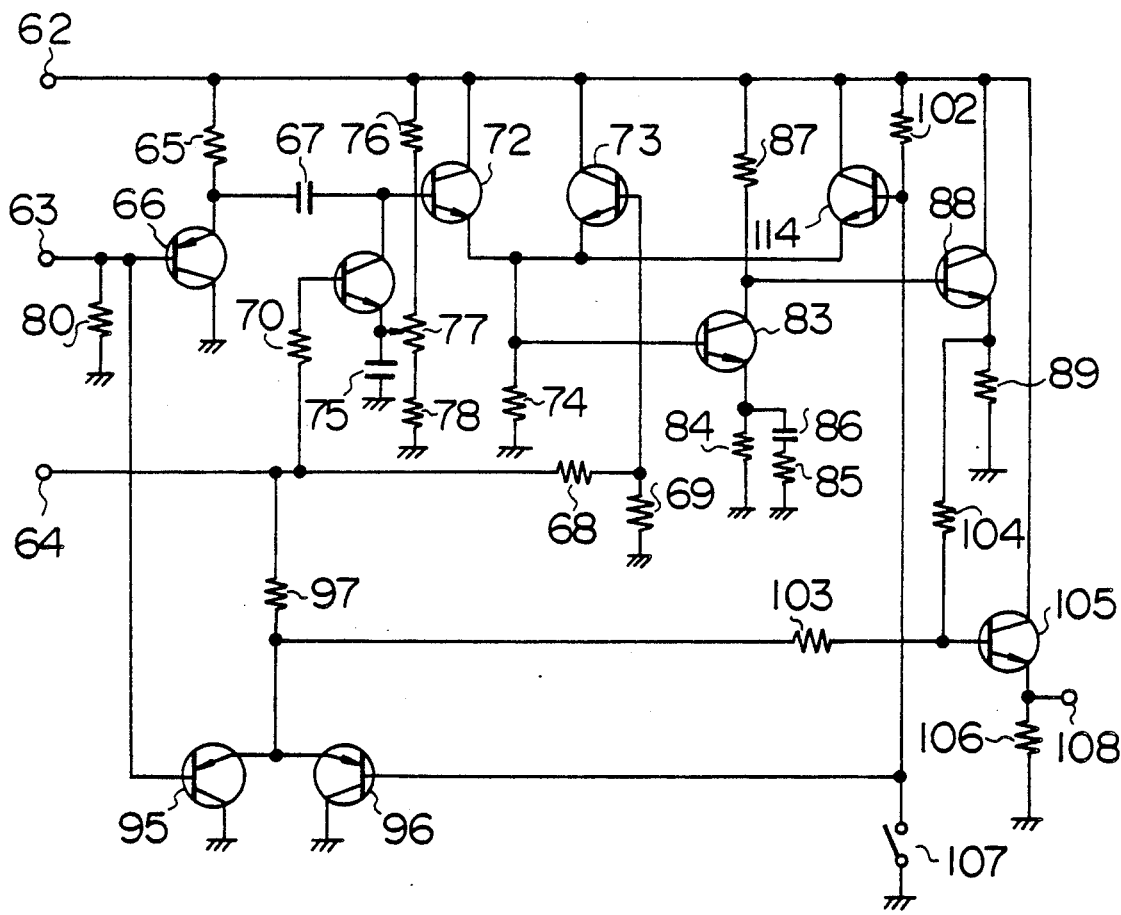
FIG. 19 is a circuit diagram showing a concrete example of the composite circuit of the video blanking circuit, the inverting amplifier circuit and the switching circuit.

As modifications of this embodiment, the blanking circuit 11 and the inverting amplifier circuit 12 may be replaced by each other in their position; and the blanking circuit 11 and/or inverting amplifier 12 may be included in the signal processing circuit 13 or placed at the subsequent stage thereof. Further, the blanking circuit 11, the inverting amplifier 12 and the switch 91 may be collected as shown in FIG. 19 to reduce the number of components. Further, if the switch 91 is made controllable by a control program using a register, high speed inversion of black/white instantaneously changed can be realized.

Further, also in the display medium other than CRT, if the display signal is added to the video signal in the same manner as described hitherto, the background can be expanded around the valid display area.

Figure 20:
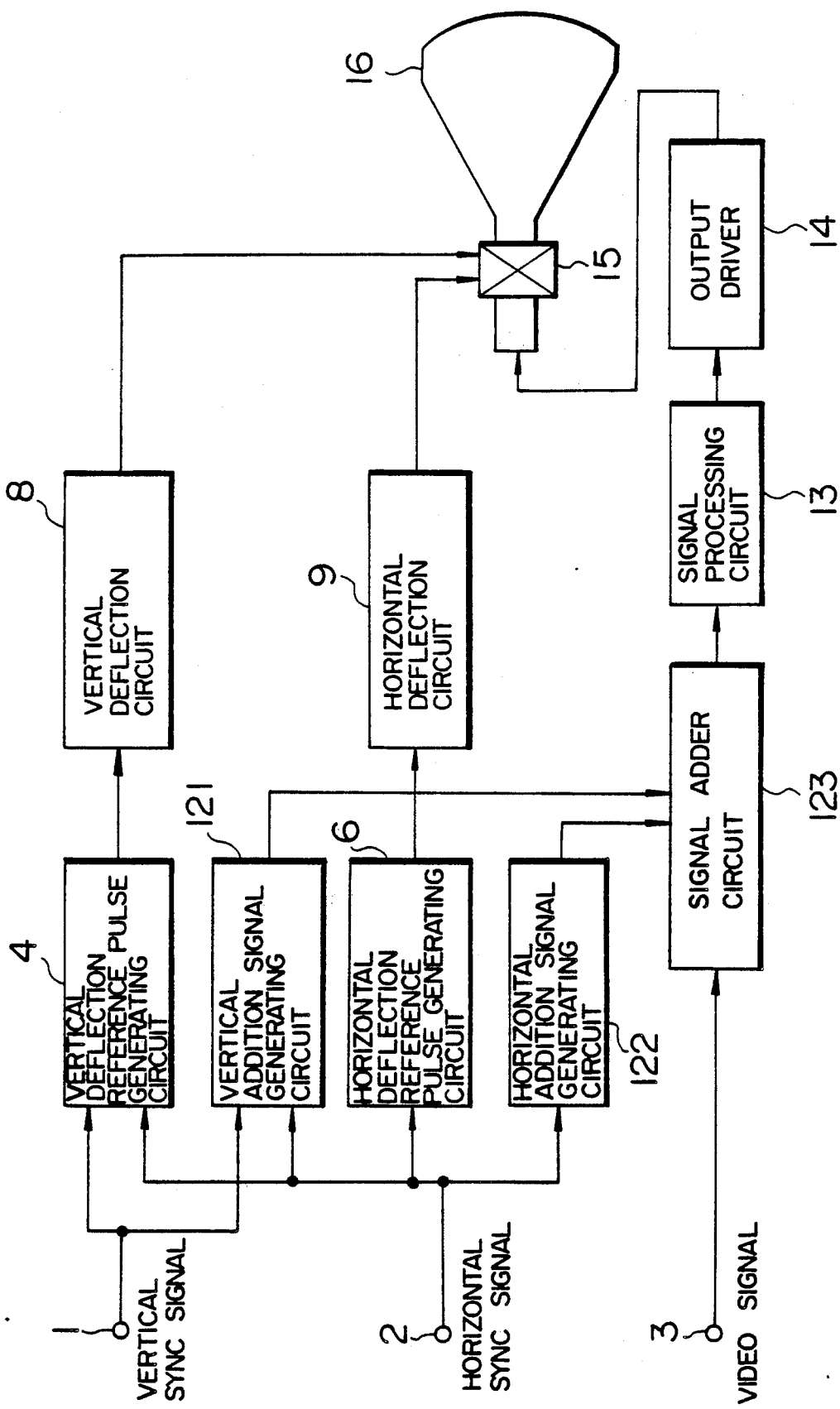
FIG. 20 is a block diagram showing still another embodiment of the present invention.

FIG. 20 shows still another embodiment of the present invention. This embodiment intends to add a background signal by an adder circuit 123 instead of the blanking circuit and the inverting amplifier in the embodiment of FIG. 1. In FIG. 20, like reference numerals designate like parts in FIG. 1. A vertical addition signal generating circuit 121 generates a vertical signal to be added to a video signal (vertical addition signal) on the basis of a vertical sync signal and a horizontal sync signal. A horizontal addition signal generating circuit 122 generates a horizontal signal to be added to the video signal (horizontal addition signal) on the basis of the horizontal sync signal. The video signal input from a terminal 3 is supplied with a vertical/horizontal addition signal by the adder circuit 123, and is subjected to the signal processing such as black level setting and white level gain adjustment at a signal processing circuit 113 to display on the CRT 16 through the output driver 14.

Figure 21:
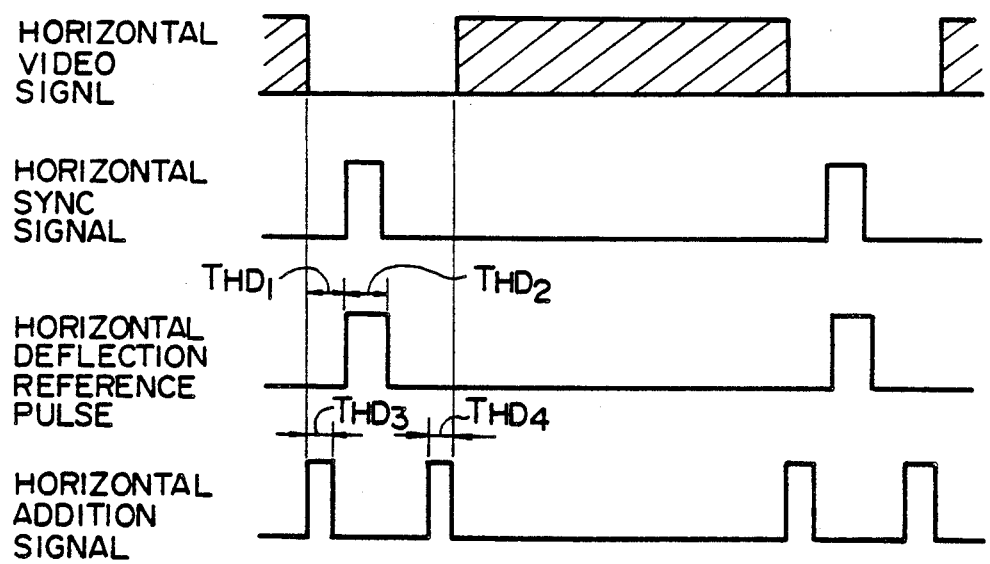
FIG. 21 is a timing chart showing the relationship among a horizontal video signal, a horizontal sync signal, a horizontal deflection signal and a horizontal addition signal in the embodiment of FIG. 20.

The horizontal addition signal generating circuit 122 generates a horizontal signal to be added to the video signal in response to inputting of the horizontal sync signal. As seen from the waveform shown in FIG. 21, the horizontal addition signal is a pulse the output of which occurs for a predetermined period (THD3) from completion of a horizontal display period between completion of the horizontal display period and start of the output of a horizontal deflection reference pulse and also occurs for a predetermined period (THD4) before start of the horizontal display period between the completion of the output of the horizontal deflection reference signal and start of the horizontal display period. In this embodiment, these periods are set as THD3=THD4=1.06 μs=56 dots as in the embodiment of FIG. 1.

Figure 22:
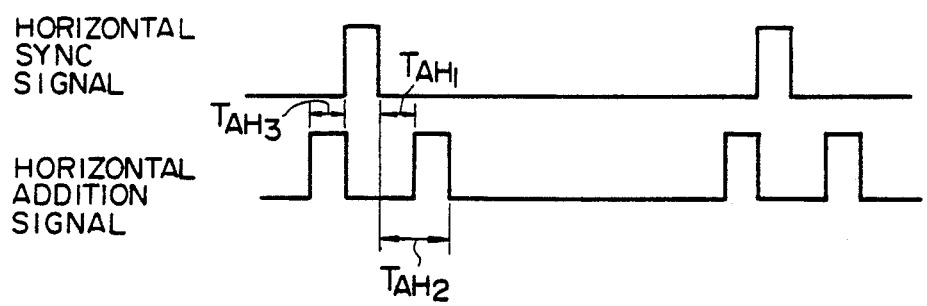
FIG. 22 is a timing chart showing the relationship between the horizontal sync signal and the horizontal addition signal of the embodiment of FIG. 20.

FIG. 22 shows the relationship between the horizontal sync signal and the horizontal addition signal of the embodiment. In FIG. 22, an upper signal is the horizontal sync signal and a lower signal is the horizontal sync signal. The horizontal addition signal is a pulse the output of which occurs for 1.06 μs=56 dots from completion of the horizontal valid display period to start of the output of the horizontal sync signal and also occurs for 1.06 μs starting from 1.06 μs before start of the horizontal display period and ending at the start of the same period.

Figure 23:
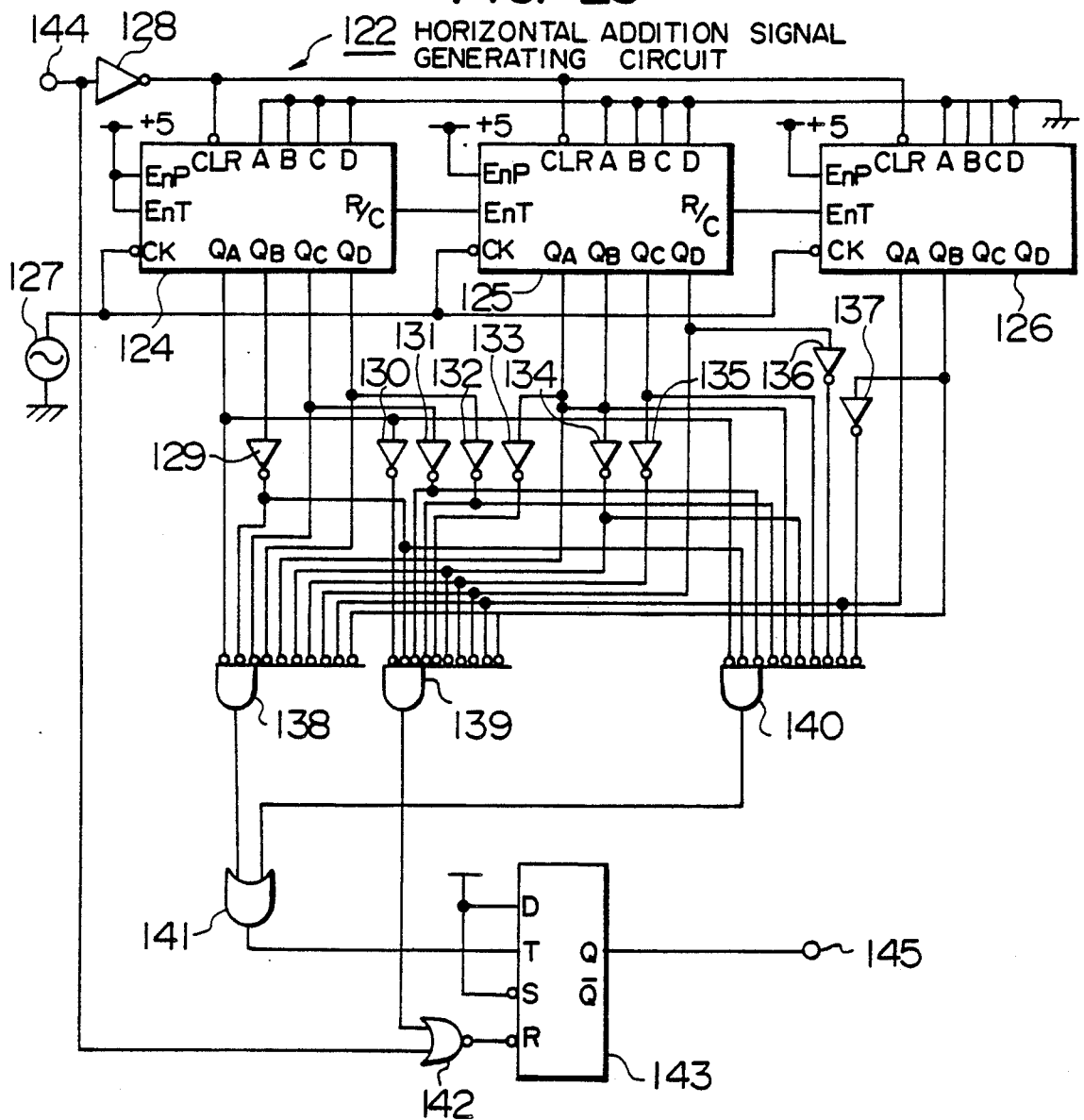
FIG. 23 is a circuit diagram showing a concrete example of the horizontal addition signal generating circuit shown in FIG. 20.

FIG. 23 shows a concrete example of the horizontal addition signal generating circuit 122; this circuit is characterized by using counters (e.g. 74LS161) 124, 125 and 126. A terminal 144 is a horizontal sync signal input terminal and a terminal 145 is a horizontal addition signal output terminal. The counters 124, 125 and 126 serve to 2n-divide the clock input from a CK terminal. Inverters 129 to 137 and NAND gates 138 to 140 constitute a decoder. In such a construction, the NAND gate 138 produces an output between 196-th count and 197-th count; the NAND gate 139 produces an output between 252-th count and 253-th count; and the NAND gate 140 produces an output between 1372-th count and 1373-th count. 143 denotes D-type flip-flop e.g. 74LS74) in which during a period from T input to R input, a Q terminal is placed at "H". The counters 124, 125 and 126, which are reset by the horizontal sync signal input from the terminal 144, start count after the horizontal sync signal becomes "L" and thus "H" is output from the terminal 145 from 196-th count after the horizontal sync signal falling to "L" till 252-th count and also from 1372-th count till the time when the horizontal sync signal becomes "H". Assuming that an oscillator 127 generates a signal of the frequency 52.9 MHz (18.9 μs) equal to that of a clock for the control circuit, as seen from FIG. 22, the horizontal addition signal occurs for 56 dots=1.06 μs (TAH2−TAH1) after 3.70 μs (TAH1) from completion of the horizontal sync signal and for 1.06 μs from 1.06 μs before the start of the horizontal sync signal till the start of the same signal. As previously described (FIG. 2) in connection with the embodiment of FIG. 1, the valid display area starts 252 dots=4.76 μs after the end of the horizontal sync signal and terminates 56 dots=1.06 μs before the start thereof. Also the horizontal addition signal is located immediately before and after the valid display area. In this case, if the horizontal addition signal and the valid display area do not continuously occur, the video signal when supplied with a background data disadvantageously provides problems such as an opening therefor and overlaps therewith. Therefore, the horizontal addition signal generating circuit 122 is required to have an accuracy within 1 dot and thus a frequency divider circuit having a high accuracy oscillator is adopted as the oscillator 27.

The vertical addition signal generating circuit 121, in response to inputting of the vertical sync signal and horizontal sync signal, generates a vertical addition signal to be added to the video signal; the vertical addition signal is a pulse generated in the period other than the horizontal blanking period between the completion of the vertical display period and the start of output of the vertical deflection reference pulse and terminated between the completion of output of the vertical deflection reference pulse and the start of the vertical display period. Now it should be noted that if the vertical addition signal is changed while the horizontal sync signal is '0', i.e. during the horizontal scanning period, the background added outside the valid display period starts or terminates in the middle of the screen. Therefore, in order that the background starts from the left end and terminates at the right end of the screen, the vertical addition signal must change while the blanking period. Specifically, the output of the pulse must start between the completion of the vertical display period and the start of output of the vertical deflection reference pulse and while the horizontal sync signal is '1' and also must terminate between the completion of output of the vertical deflection reference pulse and the star of the vertical display period and while the horizontal sync signal is '1'.

Figure 24:
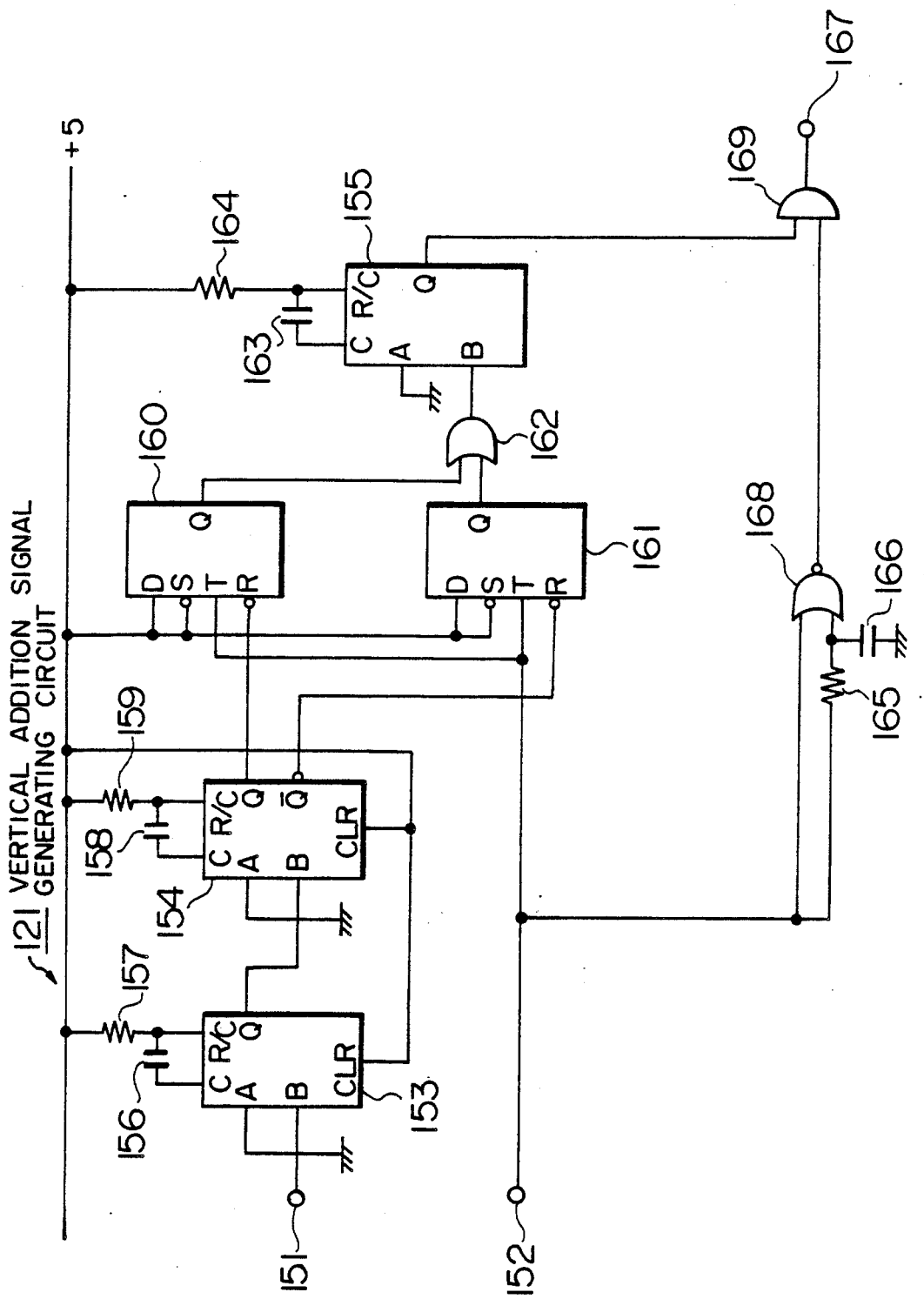
FIG. 24 is a circuit diagram showing a concrete example of the vertical addition signal generating circuit shown in FIG. 20.
Figure 25A:
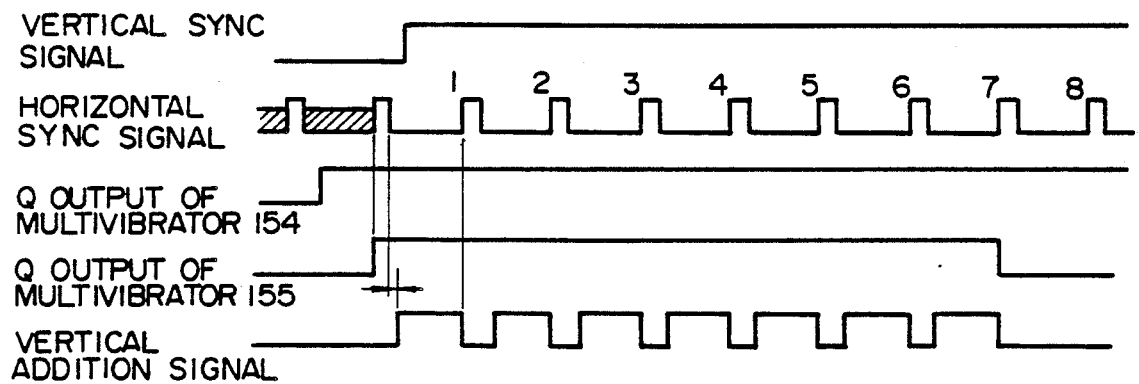
FIGS. 25A and 25B are waveform charts indicative of the operation of the vertical addition signal generating circuit of FIG. 24.
Figure 25B:
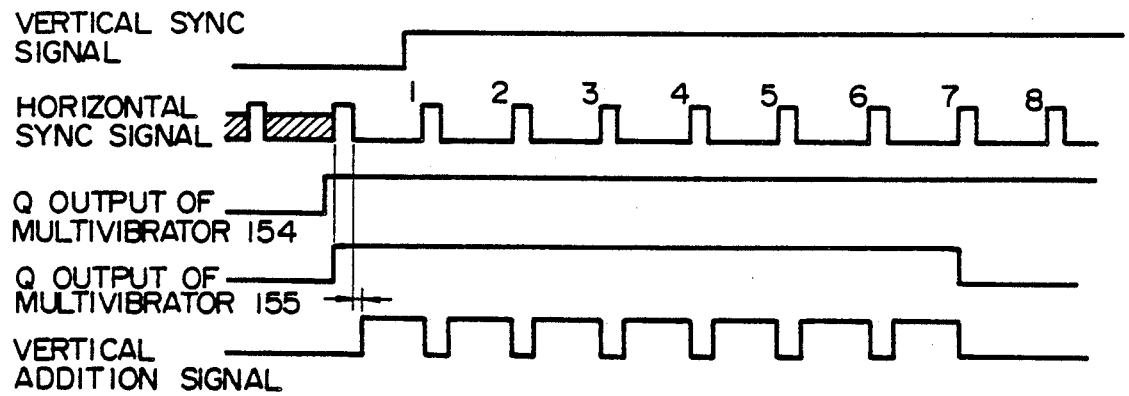

FIG. 24 shows a concrete example of the vertical addition signal generating circuit 121 which is characterized by using multivibrators (e.g. 74LS123). FIGS. 25A and 25B are waveform charts for explaining the operation of the circuit 121. In FIG. 24, a terminal 151 is a vertical sync signal input terminal; a terminal 152 is a horizontal sync signal input terminal; and a terminal 167 is a vertical addition signal output terminal. In both waveform chart of FIGS. 25A and 25B, shown from the top are the vertical sync signal, the horizontal sync signal, the Q output of a multivibrator 154, the Q output of a multivibrator 155 and the vertical addition signal. The shaded portions are valid display areas.

In operation, the vertical sync signal input from the terminal 151 is delayed in its start of the output thereof by 419.5H by the multivibrators 156 and 155 and persists for 2.35 H; the pulse thus formed is applied to the reset terminals of D-type flip-flops (e.g. 74LS74) 160 and 161. The Q outputs from the D-type flip-flops 160 and 161 rise in synchronism with the rising edge of the first horizontal signal after the reset input signal becomes "H". These Q outputs are logicably OR-ed by an OR gate 162 the output from which is applied to the B input of the multivibrator 155. The multivibrator 155 produces its Q output for 7H from the rising edge of the B input. Thus, obtained is a signal which is output for 7H from the line next to the last line in the valid display area on the rising side of the vertical sync signal and for 7H from the line next to the first line in the valid display area on the falling side of the vertical sync signal. A resistor 165, a capacitor 166 and a NOR gate 168 constitute the horizontal blanking pulse generating circuit as shown in FIG. 1 which serves to subject the vertical addition signal to blanking during the horizontal blanking period by an AND gate 169.

Figure 26:
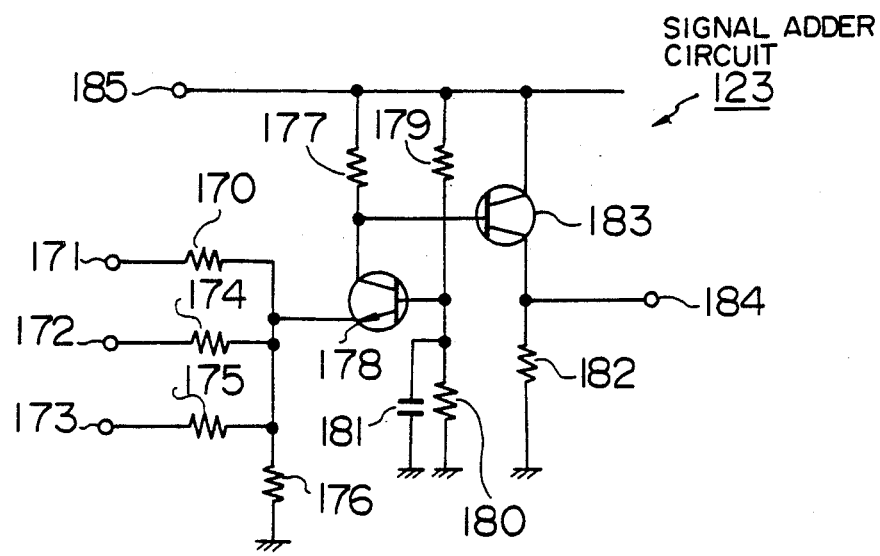
FIG. 26 is a circuit diagram showing a concrete example of the signal addition circuit.

FIG. 26 shows a concrete example of the signal adder circuit 123 which receives the video signal and the addition signal and serves to add background signals to the input video signal by means of signal adding operation using a transistor 178. In FIG. 26, a terminal 185 is a power input terminal; a terminal 171 is a vertical addition signal input terminal; a terminal 172 is a horizontal addition input terminal, a terminal 173 is a video signal input terminal; and a terminal 184 is an output terminal of the signal adder circuit. The transistor 178 is an adder circuit in the form of a common base amplifier circuit. The input/output voltage gains for the respective input terminals are Av (171)=R177/R170, Ax (172)=R177/R174, Av (173)=R177/R175. The addition ratio is given by 1/R170:1/R174:1/R175. In this embodiment, in order to make equal the highest levels of the signals added and th video signal within the valid display area, the "H"/"L" level difference in the horizontal addition signal is equal to that in the vertical addition signal so that R170=R174 is set; the horizontal addition signal and the vertical addition signal have the "H"/"L" level difference=3.5 V and the input video signal has the highest/lowest level difference=1.0 V so that R174:R175=3.5:1 is set; and further in order to obtain the input/output voltage gain of 1 of the video signal in the valid display area, R175=R177 is set. Further, a transistor 183 and a resistor 182 constitute an emitter follower which serves to impedance-convert the video signal supplied with the addition signals so that it is not influenced by the subsequent stage.

Figure 27:
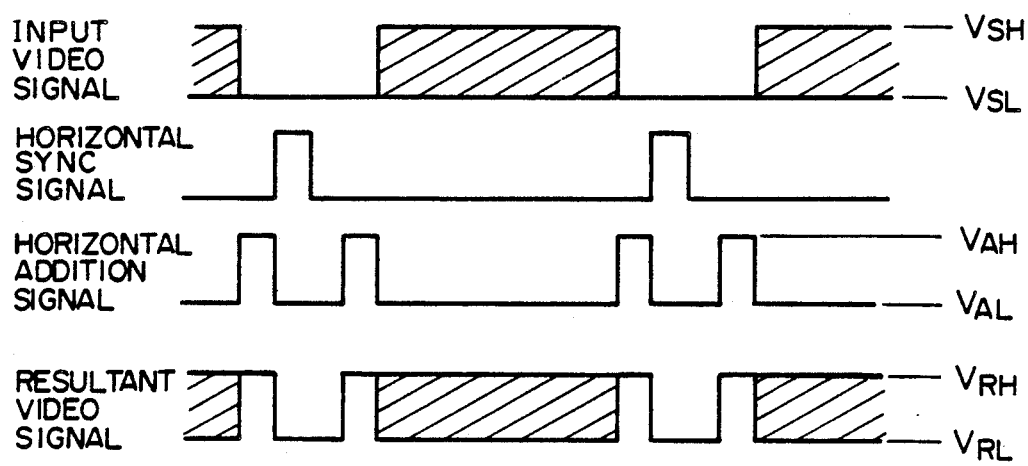
FIG. 27 is a waveform chart indicative of the operation of the signal addition circuit of FIG. 26.
Figure 28:
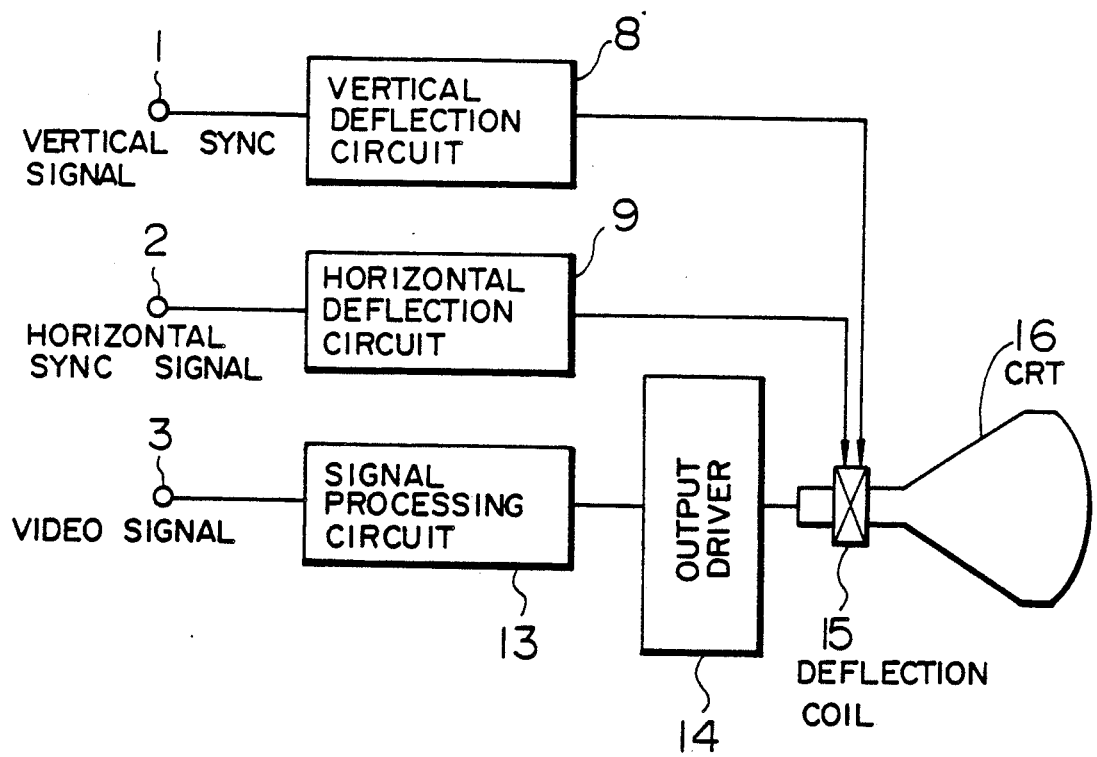
FIG. 28 is a block diagram showing a prior art CRT display device.

FIG. 27 shows the relationship among the input video signal, the horizontal sync signal, the horizontal addition signal and the resultant added video signal illustrated therein in the order from the top and so represent the operation in a horizontal cycle. As seen from FIG. 27, the video signal has the highest level during the "H" period of the horizontal/vertical addition signal so that the video signal with the highest level added by horizontal 56 dots/vertical 7H before and after the valid display area can be obtained.

The video signal output from the adder circuit 123 and supplied to the signal processing circuit 13 as an input video signal of the CRT display device will be sent to the electron gun of the CRT 16 through the output driver 14. Thus, as shown in FIG. 15C, a brightest white portion (left and right: 56 dots (total 112 dots), up and down 7 H (total 14H)) is added outside the valid display area encircled by a broken line in FIG. 15C. The resultant video signal is a positive analog signal within the valid display area. When the positive analog signal with the rating of 1.0 Vp-p (terminated at 75Ω) is input, the highest level of the input video signal represents white (brightest) whereas the lowest level thereof represents black (no display); the level difference of the input level from the lowest level indicates the brightness displayed.

If the control program providing the display format of 'background: white, character/figure: black' is applied or input to the white CRT according to this embodiment, the display format results in 'background: white, character/figure: reverse display of black (black display on a white background)'. Thus, in accordance with this embodiment, the same display format as in the embodiment can be realized. The background size is horizontal 1232 dots×808 dots which is one-size larger than the valid display area (horizontal 1120 dots×vertical 780 dots).

In accordance with the present invention, the following advantages can be obtained. When 'black display on a white background' is made, because of clearance of the background located outside the valid display area, the display format realized is free from unnatural feeling and inconvenience for a user, such as shrinkage of the characters and figures displayed near the periphery of the valid display area and impossibility of displaying some data (characters or figures) in the outermost periphery of the valid display area.

Further, since the video signal can be inverted in a display device, it is not necessary to remake a control device and a control program to realize 'black display on a white background' in a system for 'white display on a black background'.

Further, since a signal adder circuit can be provided to the conventional green CRT display device, the display device can be designed so that sole difference between the green CRT display device and the paper white CRT display device is the presence of the adder circuit; thus, a common display device can be used for both of the display devices.

I claim:

1. A display apparatus comprising:
   display means;
   means for receiving a vertical synchronization (sync) signal, a horizontal sync signal, a video signal, in synchronism with the vertical sync signal and the horizontal sync signal, having a prescribed display area;
   deflection signal generating means for generating a deflection signal on the basis of the received vertical sync signal and horizontal sync signal and supplying the deflection signal thus generated to said display means;
   video signal adding means for adding an additional video signal outside of said display area of said received video signal on the basis of said vertical sync signal and said horizontal sync signal so that the display area is expanded, and supplying the video signal thus formed to said display means.

2. A display apparatus according to claim 1, wherein said video signal adding means comprises:
   means for generating a video blanking pulse on the basis of said vertical sync signal and said horizontal sync signal;
   blanking means for executing blanking for said received video signal in response to inputting of said video signal received and the blanking pulse generated;
   inverting amplifying means for inverting the video signal output from said blanking means and supplying the video signal inverted to said display means.

3. A display apparatus according to claim 2, wherein said generating means comprises:
   a first circuit for generating a vertical blanking pulse on the basis of said vertical sync signal and said horizontal sync signal, the vertical blanking pulse being generated during a horizontal blanking period;
   a second circuit for generating a horizontal blanking pulse on the basis of said horizontal sync signal; and
   a third circuit for taking a logical sum of the said vertical blanking pulse and said horizontal blanking pulse to provide said video blanking pulse.

4. A display apparatus according to claim 1, wherein said video signal adding means comprises:
   means for generating a vertical addition signal and a horizontal addition signal on the basis of said vertical sync signal and said horizontal sync signal; and
   signal adding means for adding said vertical and horizontal addition signal to said video signal received and the video signal thus generated to said display means.

5. A display apparatus according to claim 1, further comprising means for selecting one of said received video signal and the video signal from said video signal adding means.

6. A display apparatus according to claim 1, wherein said display means is a CRT.

7. A display apparatus for displaying a white background and a character/figure of the color other than white using a video signal, comprising:
   display means;
   means for receiving a vertical synchronization (sync) signal, a horizontal sync signal, a video signal, in synchronism with the vertical sync signal and the horizontal sync signal, having a prescribed display area;
   deflection signal generating mean for generating a deflection signal on the basis of the received vertical sync signal and horizontal sync signal and supplying the deflection signal thus generated to said display means;
   video signal adding means for adding a white display video signal outside of said display area of said received video signal on the basis of said vertical sync signal and said horizontal sync signal and supplying the video signal thus formed to said display means.

8. A display system composed of a control device and a display apparatus connected with the control device wherein said control device serves to generate sync signals and a video signal, in synchronism with the sync signals, having a prescribed display area and supply these signals to said display apparatus; and said display apparatus comprises:
   display means;
   deflection signal generating means for generating a deflection signal on the basis of said sync signals received from said control means and supplying said deflection signal thus generated to said display means; and
   video signal adding means for adding an additional video signal outside of said display area of said received video signal on the basis of said sync signals so that said display area is expanded.

9. A display system according to claim 8, wherein said video signal adding means comprises;
   generating means for generating a video blanking signal on the basis of said sync signals, said video blanking signal being generated outside said display area with a timing and signal width of adding said video signal outside of said display area;
   synthesizing means for synthesizing a video signal from said video signal received and said video blanking signal; and
   inverting means for inverting the video signal output from said synthesizing means.

10. A display system according to claim 8, further comprising switch means for selecting one of said video signal received and the video signal output from said video signal adding means to supply it to said display means.

* * * * *